US011709069B2

(12) United States Patent
Kim et al.

(10) Patent No.: US 11,709,069 B2
(45) Date of Patent: Jul. 25, 2023

(54) METHOD AND DEVICE FOR DISPLAYING 3D AUGMENTED REALITY NAVIGATION INFORMATION

(71) Applicant: Samsung Electronics Co., Ltd., Suwon-si (KR)

(72) Inventors: Dohyoung Kim, Suwon-si (KR); Yongjun Lim, Suwon-si (KR); Jinah Kong, Suwon-si (KR); Kyusung Kim, Suwon-si (KR); Jaeyeon Rho, Suwon-si (KR); Juyeon You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/128,810

(22) Filed: Dec. 21, 2020

(65) Prior Publication Data

US 2021/0207971 A1 Jul. 8, 2021

(30) Foreign Application Priority Data

Jan. 2, 2020 (KR) ........................ 10-2020-0000329

(51) Int. Cl.
*G01C 21/36* (2006.01)
*G06K 9/00* (2022.01)
(Continued)

(52) U.S. Cl.
CPC ....... *G01C 21/365* (2013.01); *G01C 21/3635* (2013.01); *G01C 21/3647* (2013.01);
(Continued)

(58) Field of Classification Search
None
See application file for complete search history.

(56) References Cited

U.S. PATENT DOCUMENTS 10,215,583 B2 2/2019 Ng-Thow-Hing et al.
2004/0066376 A1 4/2004 Donath et al.
(Continued)

FOREIGN PATENT DOCUMENTS

JP 2013-123970 A 6/2013
JP 6784054 B2 * 11/2020
(Continued)

OTHER PUBLICATIONS

Machine translation of KR 101855940 B1 (Year: 2018).*
(Continued)

*Primary Examiner* — Anne Marie Antonucci
*Assistant Examiner* — Kyle S Park
(74) *Attorney, Agent, or Firm* — Jefferson IP Law, LLP

(57) ABSTRACT

A device and a method are provided. The device includes a communication module, a memory, and a processor. The processor is configured to acquire position information of a vehicle via the communication module, determine whether high definition (HD) map information corresponding to the position information is acquired, display three-dimensional (3D) navigation information in augmented reality by using the HD map information when the HD map information is acquired, and display two-dimensional (2D) navigation information in augmented reality when the HD map information is not acquired. The 3D navigation information is information in which virtual 3D graphic information for driving guidance is spatially matched to and displayed on an actual object in the real world by using the HD map information, and the 2D navigation information is information in which virtual 2D graphic information for driving guidance is planarly matched to and displayed on an actual object in the real world.

16 Claims, 25 Drawing Sheets

(51) Int. Cl.
   *G06V 20/58* (2022.01)
   *G06V 20/56* (2022.01)
   *G06V 20/59* (2022.01)
   *G06T 19/00* (2011.01)

(52) U.S. Cl.
   CPC ......... *G01C 21/3658* (2013.01); *G06V 20/58* (2022.01); *G06V 20/588* (2022.01); *G06V 20/597* (2022.01); *G06T 19/006* (2013.01)

(56) References Cited

U.S. PATENT DOCUMENTS

| | | |
|---|---|---|
| 2010/0164702 A1 | 7/2010 | Sasaki et al. |
| 2012/0329527 A1 | 12/2012 | Kang et al. |
| 2013/0181982 A1 | 7/2013 | Tasaki et al. |
| 2013/0253830 A1 | 9/2013 | Breisinger et al. |
| 2014/0168265 A1 | 6/2014 | Ahn et al. |
| 2014/0268353 A1* | 9/2014 | Fujimura ............... G02B 27/01 359/630 |
| 2015/0331487 A1 | 11/2015 | Roth et al. |
| 2016/0179195 A1 | 6/2016 | Motz et al. |
| 2017/0046578 A1 | 2/2017 | Phillips |
| 2017/0187963 A1* | 6/2017 | Lee ........................ G06V 20/56 |
| 2018/0089899 A1 | 3/2018 | Piemonte et al. |
| 2019/0025580 A1 | 1/2019 | Nagano et al. |
| 2019/0041232 A1 | 2/2019 | Maruyama et al. |
| 2020/0255026 A1 | 8/2020 | Katardjiev et al. |
| 2020/0269759 A1* | 8/2020 | Watanabe .............. B60K 35/00 |
| 2021/0003414 A1* | 1/2021 | Yamaguchi .......... G01C 21/365 |
| 2021/0078407 A1 | 3/2021 | Kim et al. |

FOREIGN PATENT DOCUMENTS

| | | | |
|---|---|---|---|
| KR | 10-1409846 B1 | | 6/2014 |
| KR | 20160065724 A | * | 6/2016 |
| KR | 10-2017-0048781 | * | 5/2017 |
| KR | 101855940 B1 | * | 5/2018 |
| WO | 2019/053695 A1 | | 3/2019 |
| WO | 2019/097763 A1 | | 5/2019 |
| WO | 2019/117459 A1 | | 6/2019 |

OTHER PUBLICATIONS

Machine translation of KR 20160065724 A (Year: 2016).*
Machine translation of JP-6784054-B2 (Year: 2020).*
Machine translation of KR 10-2017-0048781 (Year: 2017).*
Indian Office Action dated Sep. 10, 2021, issued in Indian Application No. 202014056342.
International Search Report and written opinion dated Mar. 29, 2021, issued in International Application No. PCT/KR2020/018547.
European Search Report dated May 18, 2021, issued in European Application No. 20217062.7.

* cited by examiner

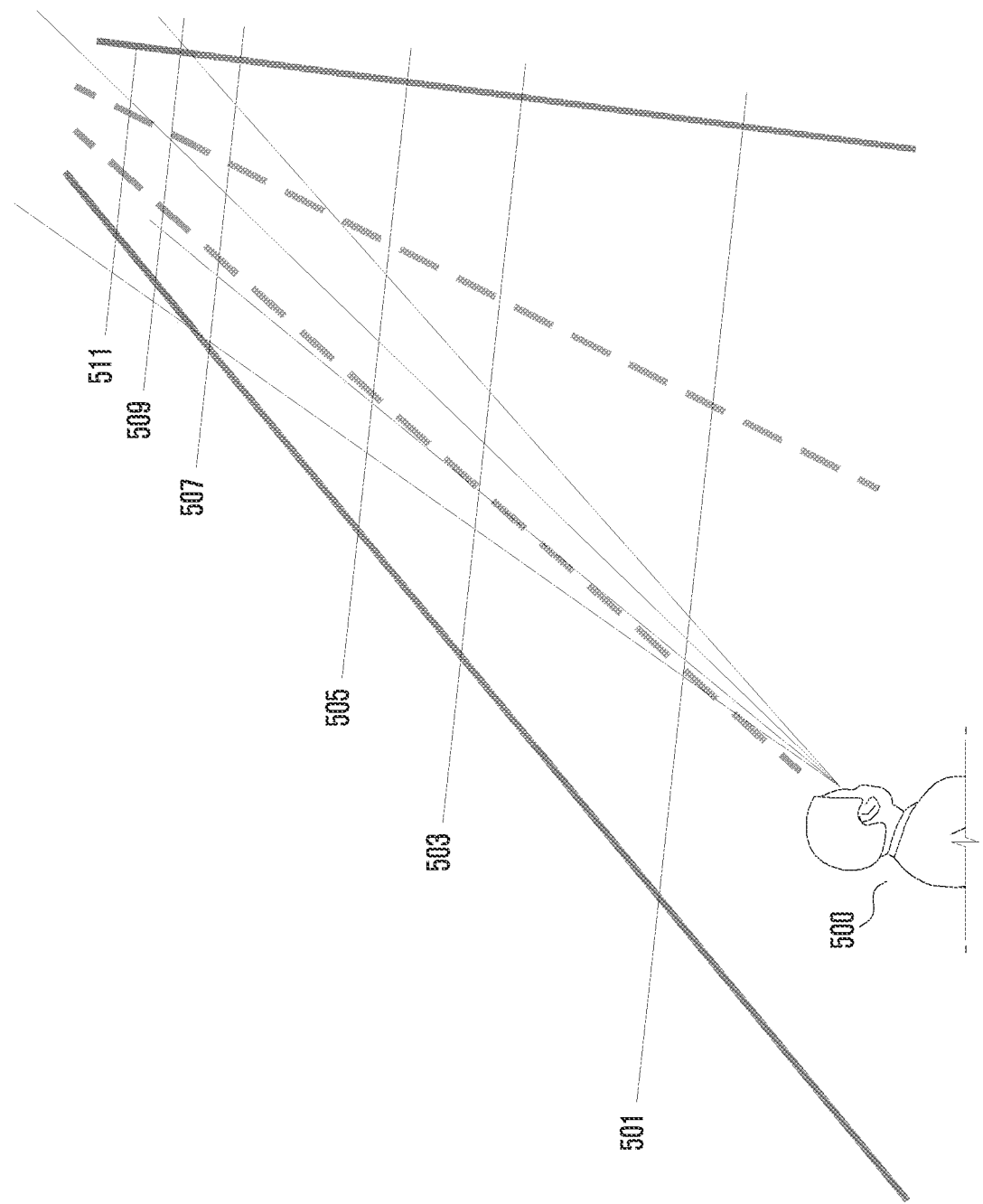

METHOD AND DEVICE FOR DISPLAYING 3D AUGMENTED REALITY NAVIGATION INFORMATION

CROSS-REFERENCE TO RELATED APPLICATION(S)

This application is based on and claims priority under 35 U.S.C. § 119(a) of a Korean patent application number 10-2020-0000329, filed on Jan. 2, 2020, in the Korean Intellectual Property Office, the disclosure of which is incorporated by reference herein in its entirety.

BACKGROUND

1. Field

The disclosure relates to a method and a device for displaying 3D augmented reality navigation information. More particularly, the disclosure relates to displaying 3D augmented reality information based on the availability of a high definition map.

2. Description of Related Art

A navigation system may provide various types of information necessary for driving on the basis of position information of a transportation means, such as an automobile or an airplane, in a transportation means field. Navigation systems may provide information in two dimensions, and, recently, have come to provide information in three dimensions. In order to provide three-dimensional navigation information, the resolution of a map may be required to be high. A new map, which has a high resolution and is capable of being acquired in real time, may be called a high definition (HD) map (or a dynamic map). A navigation system may provide navigation information by applying augmented realty (AR) to an HD map. A head-up display is provided in order to apply augmented realty to the navigation information.

The head-up display may be an electronic device for increasing safety and convenience of a user (e.g., a driver) in a transportation means such as an automobile or an airplane. The driver may see various types of information (e.g., the navigation information and route information) provided by the head-up display while looking forward. For example, in a vehicle driving at high speed, a driver may turn his/her eyes for one second to three seconds in order to look at an instrument cluster or a navigation unit. A vehicle driving at a speed of 100 kilometers per hour (km/h) moves about 55 meters (m) in only two seconds, and thus a driver may be exposed to unpredictable situations without any preparation. The head-up display displays information on the windshield of a transportation means, and thus a driver may direct his/her view forward, whereby the risk of occurrence of accidents may be reduced The above information is presented as background information only to assist with an understanding of the disclosure. No determination has been made, and no assertion is made, as to whether any of the above might be applicable as prior art with regard to the disclosure.

SUMMARY

A head-up display may provide navigation information two-dimensionally or three-dimensionally by using a high definition (HD) map (or HD map information). The head-up display may identify a road space by using HD map information, and thus may display navigation information in augmented reality in an actual driving environment. However, when navigation information is provided in three dimensions, an error may occur in a position, on which the navigation information is overlaid, according to the position of a user's eye or the position of a vehicle.

Aspects of the disclosure are to address at least the above-mentioned problems and/or disadvantages and to provide at least the advantages described below. Accordingly, an aspect of the disclosure is to provide a method and a device for appropriately providing navigation information in three-dimensional augmented reality or in two dimensions, based on position information of a vehicle, gaze information of a user, or lane information.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory, and a processor, wherein the processor is configured to acquire position information of a vehicle via the communication module, determine whether HD map information corresponding to the position information is acquired; and display three-dimensional navigation information in augmented reality by using the HD map information when the HD map information is acquired, and display two-dimensional navigation information in augmented reality when the HD map information is not acquired, wherein the three-dimensional navigation information is information in which virtual three-dimensional graphic information for driving guidance is spatially matched to and displayed on an actual object in the real world by using the HD map information, and wherein the two-dimensional navigation information is information in which virtual two-dimensional graphic information for driving guidance is planarly matched to and displayed on an actual object in the real world.

In accordance with another aspect of the disclosure, an operation method is provided. The method includes acquiring position information of a vehicle from a communication module of the electronic device, determining whether HD map information corresponding to the position information is acquired; displaying three-dimensional navigation information in augmented reality by using the HD map information when the HD map information is acquired, and displaying two-dimensional navigation information in augmented reality when the HD map information is not acquired, wherein the three-dimensional navigation information is information in which virtual three-dimensional graphic information for driving guidance is spatially matched to and displayed on an actual object in the real world by using the HD map information, and the two-dimensional navigation information is information in which virtual two-dimensional graphic information for driving guidance is planarly matched to and displayed on an actual object in the real world.

According to various embodiments, it is possible to enhance user convenience by appropriately providing navigation information in three-dimensional augmented reality or in two dimensions based on vehicle position information, information on a user's gaze, or lane information.

According to various embodiments, it is possible to provide three-dimensional augmented reality (AR) navigation information by detecting an object (e.g., a terrain, a topographical feature) by using HD map information, calculating the distance (or depth) between the object and a vehicle, detecting gaze information or lane information by using sensors disposed inside/outside the vehicle, and correcting an error of the calculated distance.

According to various embodiments, it is possible to adjust, based on information on a driver's gaze, three-dimensional navigation information displayed on an object, thereby overlaying and displaying navigation information at an accurate position.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A illustrates a navigation information display point based on a user's gaze according to an embodiment of the disclosure;

Throughout the drawings, like reference numerals will be understood to refer to like parts, components, and structures.

DETAILED DESCRIPTION

Figure 1:
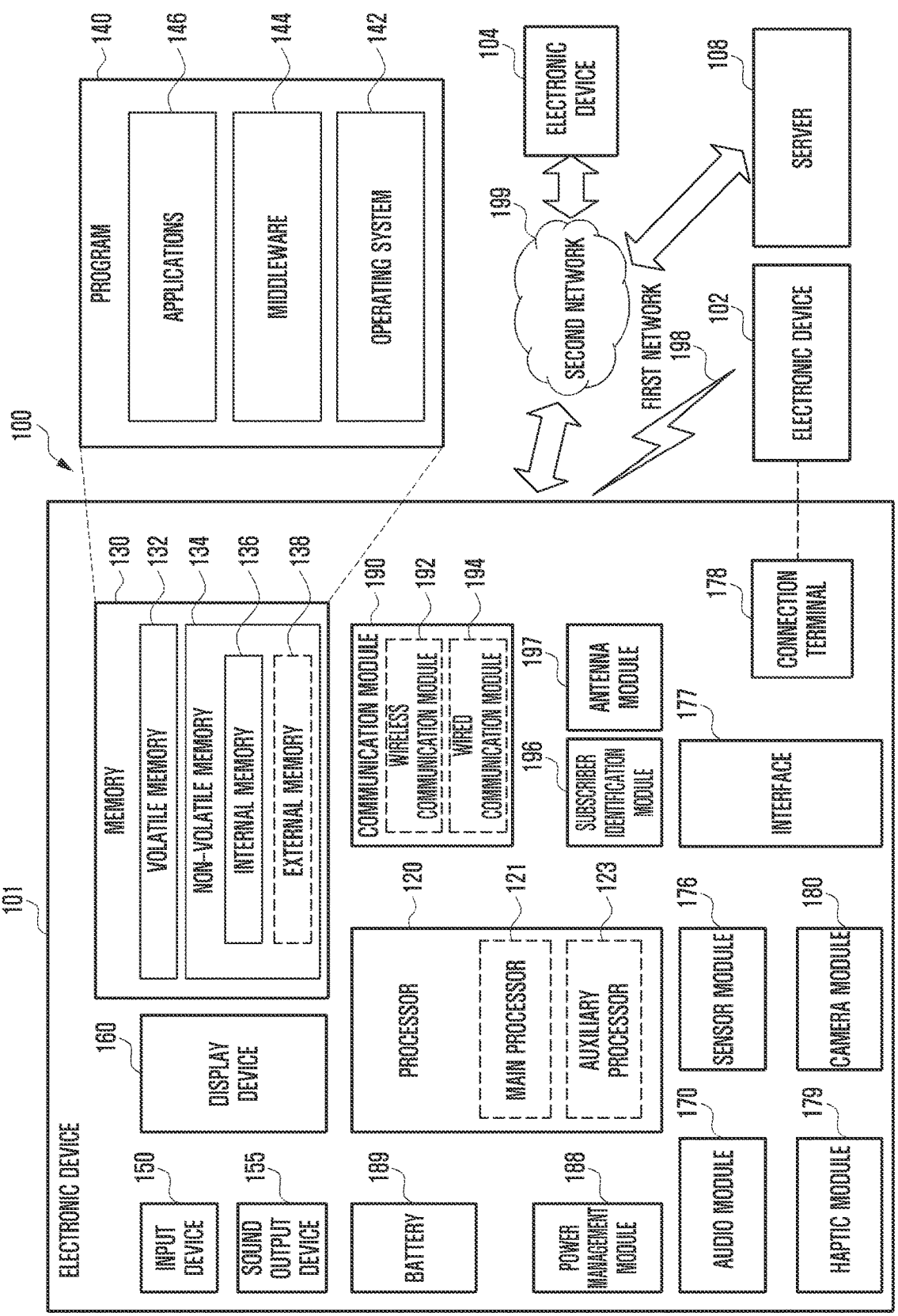
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
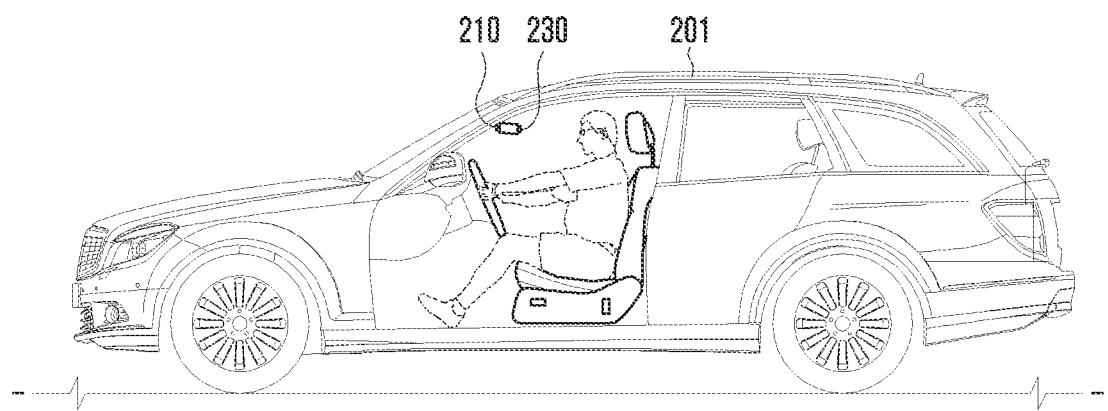
FIG. 2A illustrates an example in which elements included in an electronic device are disposed in a vehicle according to an embodiment of the disclosure.
Figure 2B:
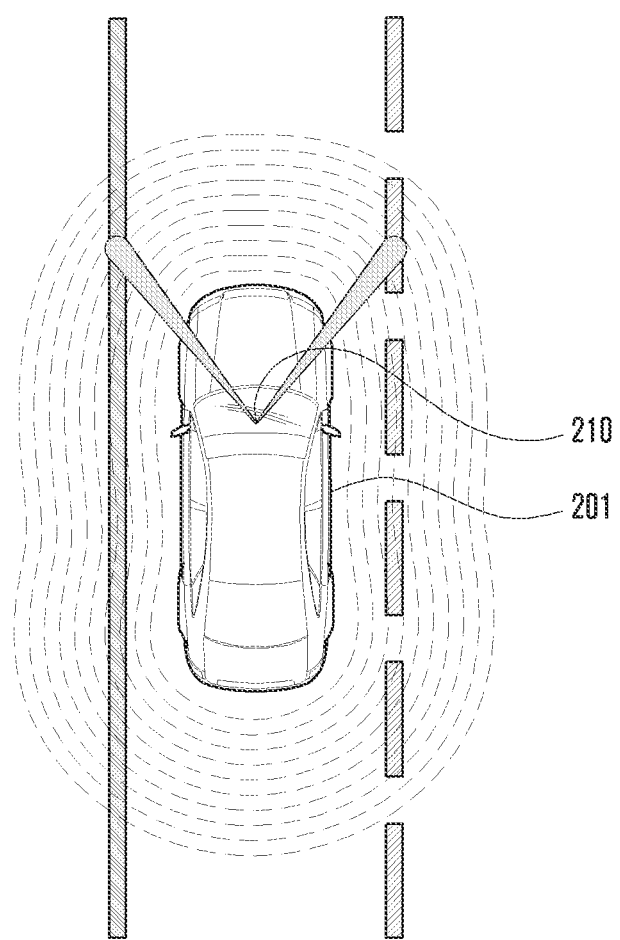
FIG. 2B illustrates an example in which elements included in an electronic device are disposed in a vehicle according to an embodiment of the disclosure.

FIG. 2A illustrates an example in which elements included in an electronic device are disposed in a vehicle according to an embodiment of the disclosure, and FIG. 2B illustrates an example in which elements included in an electronic device are disposed in a vehicle according to an embodiment of the disclosure.

FIG. 2A illustrates an example in which elements included in an electronic device are disposed when a vehicle is seen from the side. FIG. 2B illustrates an example in which elements included in an electronic device are disposed when a vehicle is seen from above.

Referring to FIGS. 2A and 2B, an electronic device (e.g., the electronic device 101 in FIG. 1) according to various embodiments may be implemented in the form of a head-up display (HUD). The electronic device 101 may include a driving environment sensing (or detecting) module 210 or a driver sensing (or detecting) module 230. The driving environment sensing module 210, which includes a sensor or camera disposed inside or outside of a vehicle 201, may sense (or detect) the driving environment of the vehicle 201.

For example, the driving environment sensing module 210 may include at least one of a global positioning system GPS sensor (or a receiver), light detection and ranging (LIDAR), an acceleration sensor, a geomagnetic sensor, or a first camera. The GPS sensor may receive position information from a position information system (or a satellite) in real time. LIDAR is an abbreviation for a light detection and ranging or an acronym for laser imaging, detection and ranging, and may be a sensor that senses distance, direction, speed, temperature, and material distribution and concentration characteristics by emitting laser beams to a target (e.g., an object (e.g., terrain (a river, a mountain, a beach) or a topographical feature (e.g., a road, a building, a sign))) and measuring how long it takes for the beams to return and the strength of the beams. LIDAR may measure the distance from the current position of the vehicle 201 to an object.

The acceleration sensor may be a sensor for detecting the speed of the vehicle 201. The geomagnetic sensor may be a sensor for detecting the direction (or steering angle) of the vehicle 201, for example, yaw, roll, and pitch. The first camera may capture an image in front of or behind the vehicle 201. The first camera may be disposed to capture an image in front of the vehicle 201 and may capture an image in front of the vehicle 201 within a distance (e.g., 10 m) configured based on the angle of view or the resolution. The driving environment sensing module 210 may provide an information processing module (e.g., the information processing module 330 in FIG. 3) with the image captured by the first camera or sensor values measured by the sensor. The sensor values measured by the sensors may include at least one of position information of the vehicle 201 (e.g., a current position of the vehicle 201), speed information of the vehicle 201, steering-angle information of the vehicle 201, or information on the distance between the vehicle 201 and an object (e.g., an object positioned near the vehicle 201).

The driver sensing module 230, which includes a sensor or a second camera disposed inside a vehicle, may capture an image of a driver's face. For example, the driver sensing module 230 may capture an image of a user's face by capturing an image of the driver's seat in the vehicle 201. The driver sensing module 230 may provide a driver image obtained by capturing an image of the driver's face to the information processing module 330. In addition, the head-up display may further include various elements for sensing a driving environment or detecting a driver's gaze. Each element may be mounted inside or outside the vehicle 201. For example, each element may be disposed in at least one of the front surface, the opposite side surfaces, or the rear surface of the vehicle 201.

The electronic device 101, which is implemented in the form of a head-up display, may be classified into a windshield-type or a combiner-type according to an information display method.

Figure 2C:
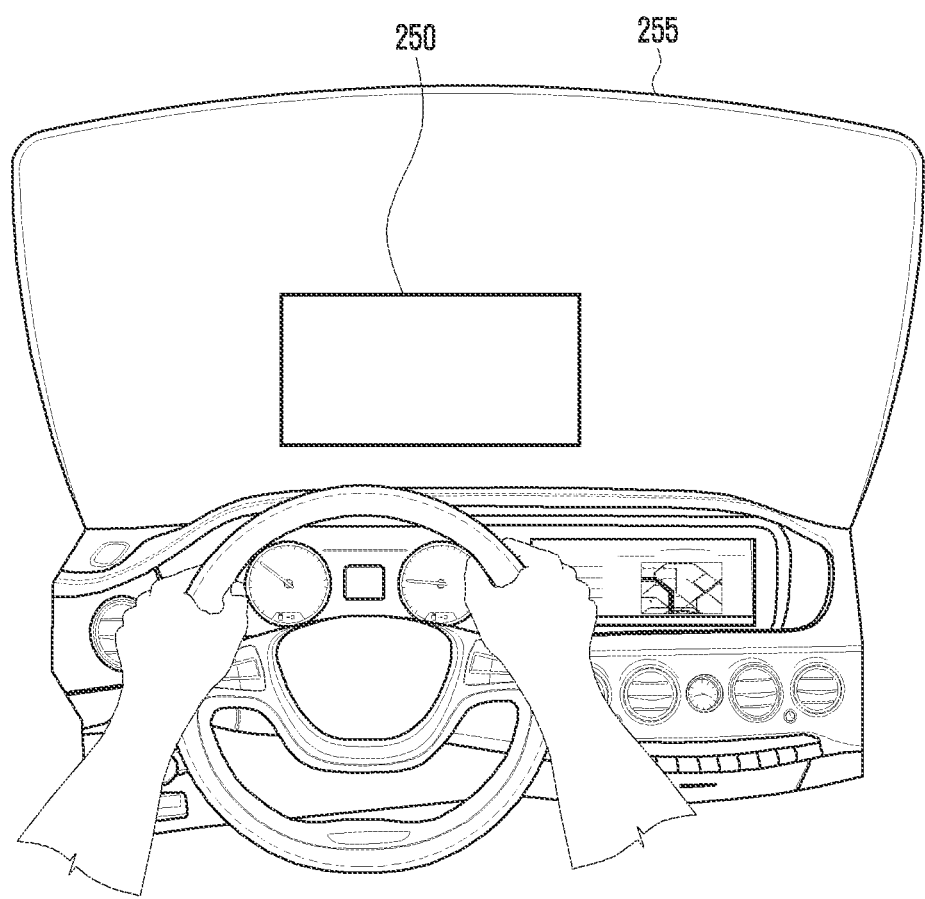
FIG. 2C illustrates a display type of an electronic device according to an embodiment of the disclosure.
Figure 2D:
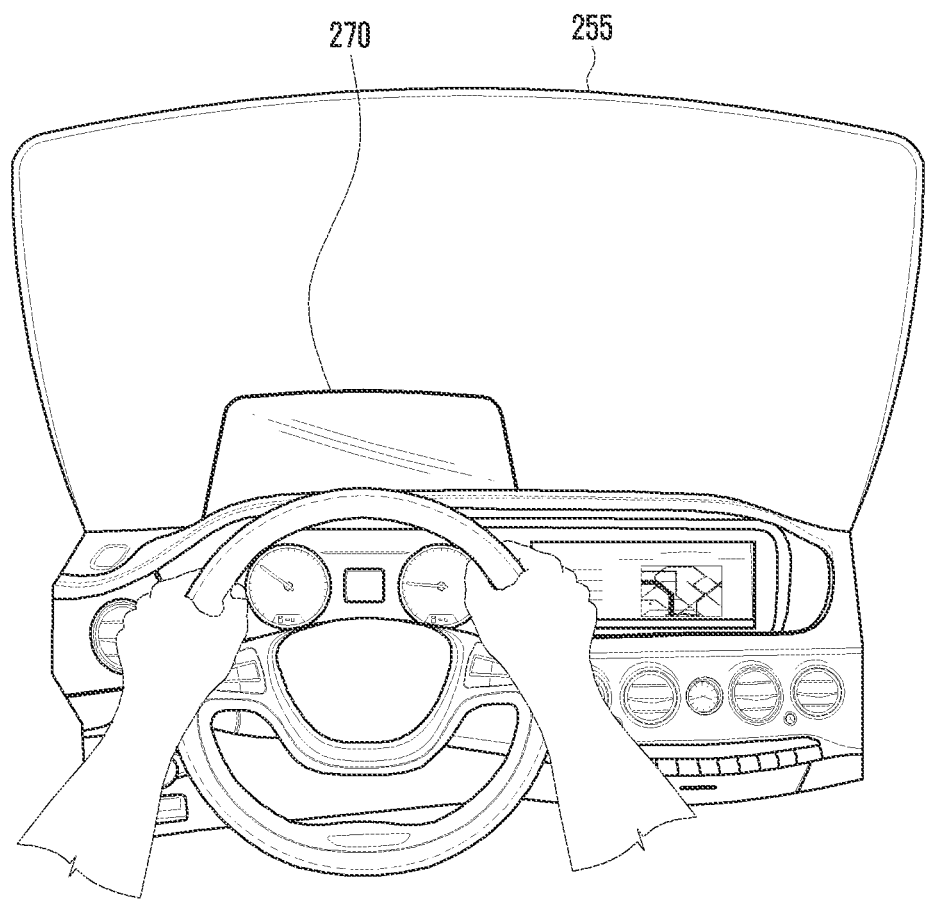
FIG. 2D illustrates a display type of an electronic device according to an embodiment of the disclosure.

FIG. 2C illustrates a display type of an electronic device according to an embodiment of the disclosure, and FIG. 2D illustrates a display type of an electronic device according to an embodiment of the disclosure.

FIG. 2C illustrates an example of a windshield-type head-up display according to an embodiment of the disclosure.

Referring to FIG. 2C, the windshield-type head-up display may be a display in which a transparent film is attached to one portion 250 of a windshield 255 of a vehicle, and may display information (e.g., navigation information or route-guidance information) via the attached transparent film. The transparent film may be attached by a user, or a vehicle may be sold having the transparent film attached thereto.

FIG. 2D illustrates an example of a combiner-type head-up display according to an embodiment of the disclosure.

Referring to FIG. 2D, in the combiner-type, a transparent plastic disk 270 may be installed (mounted) close to one portion of the windshield 255 of the vehicle (e.g., on a dashboard near a driver's seat) in the vertical direction (e.g., at a predetermined angle (e.g., 90°) with respect to the ground) and information may be displayed via the plastic disk 270. The plastic disk 270 may be embedded in a vehicle and may be raised above the dashboard when the engine of the vehicle is started.

In addition to the above-described methods, the head-up display may display information by using various methods. For example, the head-up display may display information on the entire windshield of a vehicle. Hereinafter, a description will be made assuming that the electronic device 101, which is implemented in the form of a head-up display, is a windshield-type or a combiner-type, but the disclosure is not limited to the description.

Figure 3:
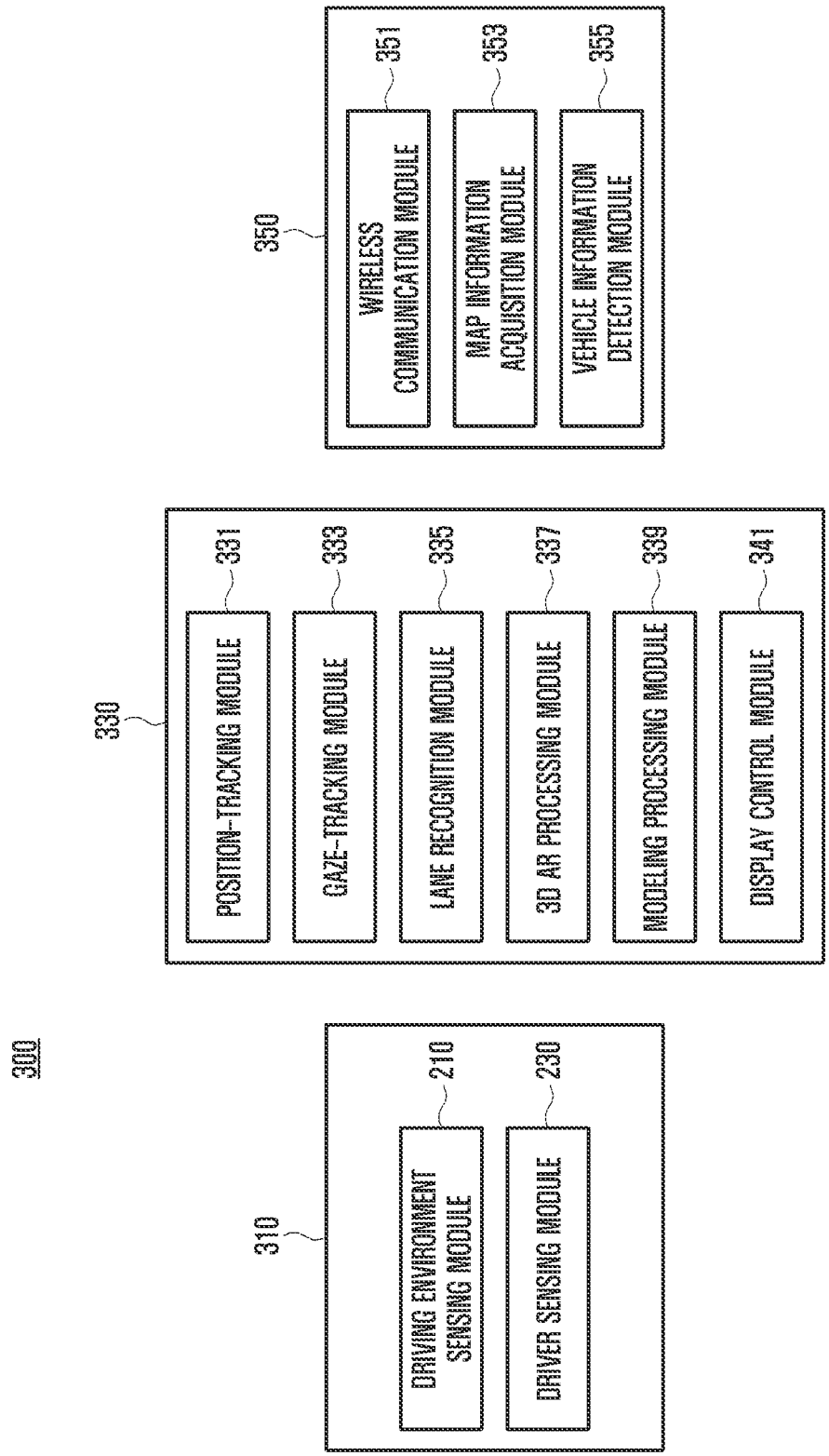
FIG. 3 illustrates an example of a function processing module of an electronic device according to an embodiment of the disclosure.

FIG. 3 illustrates an example of a function processing module of an electronic device according to an embodiment of the disclosure.

Referring to FIG. 3, an electronic device (e.g., the electronic device 101 in FIG. 1) according to various embodiments may include a function processing module 300 for providing two-dimensional or three-dimensional navigation information (or route-guidance information). The function processing module 300 may be included in the form of hardware or software in a processor (e.g., the processor 120 in FIG. 1) of the electronic device 101. The function processing module 300 may include at least one of a first information collection module 310, an information processing module 330, or a second information collection module 350.

According to various embodiments, the first information collection module 310 or the second information collection module 350, included in function processing module 300, may be omitted. The first information collection module 310 or the second information collection module 350 may be replaced with a sensor or a camera inside or outside of a vehicle (e.g., the vehicle 201 in FIGS. 2A and 2B), and the information processing module 330 may receive information from the sensor or camera mounted to the vehicle 201, and may provide two-dimensional navigation information or three-dimensional navigation information. Alternatively, when the information processing module 330 can provide two-dimensional navigation information or three-dimensional navigation information by using information received from the first information collection module 310, the second information collection module 350 may not be included. Alternatively, if information processing module 330 can provide two-dimensional navigation information or three-dimensional navigation information by using information received from the second information collection module 350, the first information collection module 310 may not be included.

The first information collection module 310 may include: the driving environment sensing module 210; and the driver sensing module 230. The driving environment sensing module 210, which includes a sensor or camera mounted (or disposed) inside or outside of the vehicle 201, may sense (or detect) the driving environment of the vehicle 201. For example, the driving environment sensing module 210 may include at least one of a GPS sensor (or a receiver), LIDAR, an acceleration sensor, a geomagnetic sensor, or a first camera. The driving environment sensing module 210 may collect, using a sensor or camera, at least one of position information of the vehicle 201, speed information thereof, and steering angle information thereof, information on the distance between the vehicle 201 and an object, or image information. The driving environment sensing module 210 may provide the collected information to the information processing module 330. The driver sensing module 230, which includes a sensor or a second camera inside a vehicle, may capture an image of a driver's face. For example, the driver sensing module 230 may capture an image of a driver's face by capturing an image of the driver seat in the vehicle 201. The driver sensing module 230 may provide a driver image, obtained by capturing an image of the driver's face, to the information processing module 330.

The second information collection module 350 may include at least one of a wireless communication module 351, a map information acquisition module 353 or a vehicle information detection module 355. The wireless communication module 351 may include a vehicle-to-everything (V2X) communication module. The V2X may be a communication technology of exchanging, through a wired or wireless network, information with another vehicle and a thing installed as infrastructure on a road. The V2X may include all types of communication technology applicable to a vehicle on a road, such as vehicle-to-vehicle (V2V) communication, communication between a vehicle and road infrastructure (e.g., a parking lot and a traffic light) (vehicle-to-infrastructure (V2I) communication), vehicle-to-pedestrian (V2P) communication, or vehicle-to-nomadic devices (V2N) communication.

The wireless communication module 351 may collect information from at least one of a vehicle, road infrastructure, a pedestrian, or another user's electronic device (e.g., the electronic devices 102 and 104 in FIG. 1). For example, the wireless communication module 351 may collect, using V2X communication, at least one of position information, speed information, driving information, information on the distance between the vehicle 201 and another vehicle, information on the distance between the vehicle 201 and an object, parking information, traffic situation information, accident information, or signal change time information. The wireless communication module 351 may have a radar, a sensor, or a camera, which is disposed inside or outside the vehicle 201 in order to collect information. The wireless communication module 351 may provide the collected information to the information processing module 330.

The map information acquisition module 353 may acquire map information. The map information acquisition module 353 may extract map information stored in a memory (e.g., the memory 130 in FIG. 1), based on information on the current position of the vehicle 201. Alternatively, the map information acquisition module 353 may transmit a signal or information on the current position of the vehicle 201 to a position providing server (e.g., the server 108 in FIG. 1) periodically or in real time, and may receive map information from the server 108. The map information may include high-definition (HD) map information or non-HD map information (e.g., a typical map). The HD map information refers to a 3D map having precision at a centimeter (cm)-level, and may be used for self-driving. The HD map information may include various types of information associated with an object (e.g., a terrain and a topographical feature) on a road (e.g., terrain information, space information, position information, and three-dimensional map information reflecting 3D space mapping information) as three-dimensional digital information. An object (or object information) included in the HD map information may be an actual object in the real world (e.g., a terrain information, topographical feature information, etc.).

For example, the object (or object information) may include at least one of lane-based road information (e.g., a lane (or the number of lanes), a boundary line, an overpass, an underground passage, a tunnel, a road surface mark, a width, a curvature, a slope, a road hump, a speed limit), traffic light information (e.g., a crossroads, a straight drive, a turn (e.g., a right turn, a left turn, and a U-turn)), sign information (e.g., a name and a direction), or building information (e.g., building coordinates and a building contour). The HD map information may further include not only information for driving (e.g., a regulated speed (or speed limit), a design, and a direction name) but also lane information and local information which are information necessary for vehicle movement. The lane information included in the HD map information may include information regarding details such as lane center lines, lane boundary surfaces, and road boundary surfaces, information regarding building contours and road surface markings, and simple position information such as signs, traffic lights, and crossroad entry parts. Unlike the HD map information, the non-HD map information may be relatively simple map information such as traffic lights, signs, and structures (e.g., tunnels) based on roads. When compared with the HD map information, the non-HD map information may have a large error range with respect to an actual object of the real world (e.g., terrain information, topographical feature information, etc.). Further, the non-HD map information may include map information having the form of a two-dimensional plane (or two-dimensional layer) based on position information. The map information acquisition module 353 may provide the acquired map information to the information processing module 330.

The vehicle information detection module 355, which is a module for detecting vehicle information, may include an electronic control unit (ECU) configured to control the states of the engine, automatic transmission, and ABS of the vehicle 201 by using a computer. For example, the ECU may detect the steering angle or speed of the vehicle 201, and may include a lane-keeping assist system (LKAS). The vehicle information may include at least one of steering angle information, speed information, or lane assist information. The vehicle information detection module 355 may detect vehicle information by using a sensor disposed inside or outside the vehicle 201, and may provide the detected vehicle information to the information processing module 330.

The information processing module 330 may include at least one of a position-tracking module 331, a gaze-tracking module 333, a lane recognition module 335, a 3D AR processing module 337, a modeling processing module 339, or a display control module 341. The position-tracking (or detecting) module 331 may track the position (or current position) of the vehicle 201, based on information collected by the first information collection module 310 or the second information collection module 350. For example, the position-tracking module 331 may receive position information from a GPS receiver included in the driving environment sensing module 210, may receive information on the distance between the vehicle 201 and an object and speed information of the vehicle 201 from LIDAR, and may receive at least one type of position information of a surrounding vehicle from the wireless communication module 351. The position-tracking module 331 may track (or acquire) position information of the vehicle 201 based on the received at least one type of information or based on HD map information received from the map information acquisition module 353. When the HD map information is acquired, the position-tracking module 331 may track more accurate position information. The position-tracking module 331 may provide the position information to the 3D AR processing module 337.

The gaze-tracking (or detecting) module 333 may track the gaze of a driver based on information collected by the first information collection module 310 or the second information collection module 350. For example, the gaze-tracking module 333 may receive a driver image (e.g., a face image) from a driver sensing module 230, and may extract features from the received driver image to track a gaze direction of the driver. The gaze-tracking module 333 may receive steering angle information from the vehicle information detection module 355, and may correct the gaze direction of the driver, based on the steering angle information. The gaze-tracking module 333 may provide the gaze information to the 3D AR processing module 337.

The lane recognition (or detection) module 335 may recognize lane information, based on information collected by the first information collection module 310 or the second information collection module 350. For example, the lane recognition module 335 may acquire a front image, obtained by capturing an image in front of the vehicle 201, from the driving environment sensing module 210, and may extract features from the acquired front image to recognize lane information. Alternatively, the lane recognition module 335 may acquire lane information from the vehicle information detection module 355, may acquire HD map information from the map information acquisition module 353, and may recognize (correct) lane information, based on the lane information and the HD map information. The lane recognition module 335 may provide the lane information to the 3D AR processing module 337.

The 3D AR processing module 337 may generate (or process), based on HD map information, navigation information (or route information) of three-dimensional augmented reality (AR). The 3D AR processing module 337 may receive position information from the position-tracking module 331, may receive gaze information from the gaze-tracking module 333, and may receive lane information from the lane recognition module 335. The 3D AR processing module 337 may generate three-dimensional navigation information, based on at least one of the position information, the gaze information, or the lane information. To this end, the 3D AR processing module 337 may generate three-dimensional navigation information in conjunction with the modeling processing module 339. The 3D AR processing module 337 may receive three-dimensional navigation information from the modeling processing module 339, and may generate three-dimensional AR navigation information by using the received three-dimensional navigation information.

The three-dimensional navigation information may be information in which virtual three-dimensional graphic information for driving guidance is spatially matched to and displayed on an actual object of the real world by using the HD map information. The graphic information may be formed in the form of at least one of a text, an image (e.g., an icon), or a video. The actual object of the real world may be various terrains and topographical features, such as roads, traffic lights and signs on roads, and rivers. The HD map information may include information on objects on a map (or position) (e.g., coordinate information). The actual object may correspond to an object included in HD map information. The three-dimensional navigation information is displayed in augmented reality on an actual object, and thus, when a distance error between the vehicle 201 and an object occurs, a display error may occur at the time of displaying graphic information by using three-dimensional AR. The display error becomes larger according to the distance, and thus accurate information on the distance between the vehicle 201 and the object may be required.

The 3D AR processing module 337 may acquire distance information from the first information collection module 310 or the second information collection module 350. Further, the 3D AR processing module 337 may calculate distance information by using object information included in HD map information. The 3D AR processing module 337 may calculate the distance information, based on the distance information acquired from the first information collection module 310 or the second information collection module 350 or based on the object information included in the HD map information. The 3D AR processing module 337 may generate, using the HD map information and the distance information, three-dimensional navigation information in which graphic information is reflected in an actual object in real time. In the three-dimensional navigation information, graphic information may be changed in real time and/or flexibly depending on the position change of a vehicle.

According to various embodiments, an error range according to gaze information and lane information with respect to an object positioned at a short distance may be smaller than an error range according to gaze information and lane information with respect to an object positioned at a remote distance. The 3D AR processing module 337 may calculate, based on the gaze information and the lane information, an angle and a distance (e.g., z-axis information, forward/backward) for displaying navigation information. The 3D AR processing module 337 may determine, based on the calculated angle and distance, a position at which three-dimensional navigation information is displayed.

The modeling processing module 339 may generate three-dimensional navigation information or two-dimensional navigation information through two-dimensional or three-dimensional modeling. The modeling processing module 339 may receive position information from the position-tracking module 331. If HD map information has been acquired, the modeling processing module 339 may generate, based on object information included in the HD map information, three-dimensional navigation information, and may transmit the three-dimensional navigation information to the 3D AR processing module 337. If HD map information has not been acquired, the modeling processing module 339 may generate two-dimensional navigation information. The two-dimensional navigation information may be information in which virtual two-dimensional graphic information for driving guidance is planarly matched to and displayed on an actual object of the real world. In the two-dimensional navigation information, graphic information may be changed in real time and/or flexibly depending on the position change of a vehicle. The two-dimensional navigation information is not generated using HD map information, and thus may have a large display error compared to the three-dimensional navigation information.

The modeling processing module 339 may correct, based on gaze information and lane information, the generated three-dimensional navigation information or two-dimensional navigation information. In order to display navigation information at an accurate position, driver gaze direction information or lane information may be required. For example, when the gaze information or the lane information is received, the modeling processing module 339 may correct, based on the gaze information or the lane information, at least one of a display angle, a display distance, or a display position of three-dimensional navigation information or two-dimensional navigation information.

The two-dimensional modeling may be a modeling technique for displaying navigation information by using two-dimensional layer. The two-dimensional modeling may include lane-based two-dimensional modeling or road-based two-dimensional modeling. The three-dimensional modeling may be a modeling technique for displaying navigation information by using a three-dimensional layer. The three-dimensional modeling may include lane-based three-dimensional modeling or road-based three-dimensional modeling. For example, lane-based modeling is a technique of modeling navigation information on the basis of a lane, and road-based modeling may be a technique of modeling navigation information on the basis of a road. When lane information is not received from the lane recognition module 335, the modeling processing module 339 may model navigation information by using road-based modeling instead of lane-based modeling. The modeling processing module 339 may generate two-dimensional navigation information and may transmit the generated two-dimensional navigation information to the display control module 341. The modeling processing module 339 may generate three-dimensional navigation information and may transmit the generated three-dimensional navigation information to the 3D AR processing module 337.

The display control module 341 may display three-dimensional navigation information or two-dimensional navigation information at a designated position. The designated position may depend on the display type of the electronic device 101. For example, in the case of a windshield-type, the designated position may be a portion of the windshield of the vehicle 201 (e.g., a portion to which a transparent film is applied). In the case of a combiner-type, the designated position may be a portion at which a plastic disk is installed (e.g., a dashboard near a driver seat). The display control module 341 may display three-dimensional navigation information or the two-dimensional navigation information through an image output module (e.g., a projector) disposed in an inner region (e.g., the ceiling above a front seat, or a rear seat) of the vehicle 201. The display control module 341 may receive two-dimensional navigation information from the modeling processing module 339 and may display the received two-dimensional navigation information. The display control module 341 may receive 3D navigation information from the 3D AR processing module 337 and may display the received 3D navigation information.

An electronic device (e.g., the electronic device 101 in FIG. 1) according to various embodiments may include: a communication module (e.g., the communication module 190 in FIG. 1); a memory (e.g., the memory 130 in FIG. 1); a processor (e.g., the processor 120 in FIG. 1), wherein the processor is configured to: acquire position information of a vehicle via the communication module; determine whether high definition (HD) map information corresponding to the position information is acquired; and display three-dimensional navigation information in augmented reality by using the HD map information when the HD map information is acquired, and display two-dimensional navigation information in augmented reality when the HD map information is not acquired, wherein the three-dimensional navigation information is information in which virtual three-dimensional graphic information for driving guidance is spatially matched to and displayed on an actual object in the real world by using the HD map information, and the two-dimensional navigation information is information in which virtual two-dimensional graphic information for driving guidance is planarly matched to and displayed on an actual object in the real world.

The electronic device may further include a first camera configured to capture a driver image of a driver in the vehicle, and the processor may be configured to: identify gaze information of a driver by using the driver image captured by the first camera; and control, based on the gaze information, displaying of the three-dimensional navigation information or the two-dimensional navigation information.

The electronic device may further include a second camera configured to capture an image in front of the vehicle, wherein the processor is configured to: identify lane information of the vehicle by using the image in front of the vehicle, captured by the second camera; and control, based on the gaze information and the lane information, displaying of the three-dimensional navigation information or the two-dimensional navigation information.

The processor may be configured to: acquire, from the communication module, information on the distance between the vehicle and an actual object near the vehicle, measured by a sensor disposed in the vehicle; and match and display the three-dimensional navigation information to and on an actual object in the real world by using the HD map information and the distance information.

The processor may be configured to: when the HD map information is acquired, determine whether a lane is recognized, based on the lane information; display three-dimensional navigation information by using the HD map information when the lane is recognized; and when the lane is not recognized, display, using the information, 3D and 2D navigation information in which three-dimensional navigation information and two-dimensional navigation information are differently displayed depending on a distance.

The processor may be configured to: calculate, based on the lane information or the gaze information, an angle and a distance for displaying the three-dimensional navigation information; determine, based on the calculated angle and distance, a display position of the three-dimensional navigation information; and display, based on the display position, the three-dimensional navigation information on an actual object of the real world.

The 3D and 2D navigation information may be configured such that 3D navigation information is displayed to correspond to a first distance, and 2D navigation information is displayed to correspond to a second distance beyond the first distance.

The processor may be configured to: generate navigation information, which is to be displayed to correspond to the second distance, as the 2D navigation information; and display the 2D navigation information on a plane at a point beyond the first distance.

The processor may be configured to determine a display position, at which the 2D navigation information is to be displayed, based on at least one of the type of road on which the vehicle drives, a crossroads, a driving environment, or a speed.

The processor may be configured to change the display position, at which the 2D navigation information is to be displayed, when a turn point is included within the first distance according to a position change of the vehicle.

The processor may be configured to display 2D navigation information corresponding to a first distance and not to display navigation information corresponding to a second distance beyond the first distance.

Figure 4A:
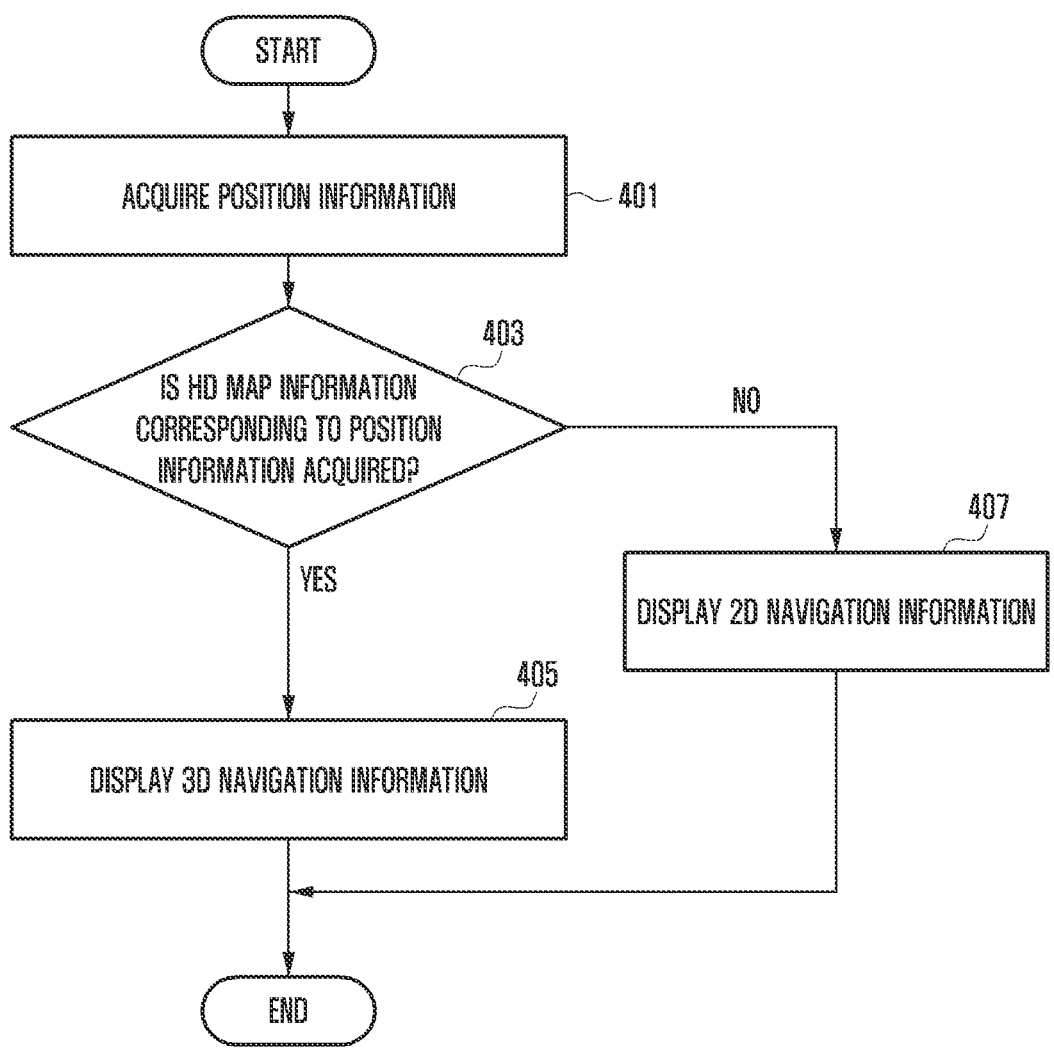
FIG. 4A is a flowchart illustrating an operation method of an electronic device according to an embodiment of the disclosure.

FIG. 4A is a flowchart illustrating an operation method of an electronic device according to an embodiment of the disclosure.

Referring to FIG. 4A, in operation 401, a processor (e.g., the processor 120 in FIG. 1) of an electronic device (e.g., the electronic device 101 in FIG. 1) according to various embodiments may acquire position information. Hereinafter, FIG. 4A illustrates an example in which operations are performed in the case in which a destination is set in order to receive navigation information (or route-guidance information) in advance for a user (or a driver). The electronic device 101 may be mounted to or disposed in a vehicle (e.g., the vehicle 201 in FIGS. 2A and 2B), and may acquire various types of information collected using a sensor or camera mounted inside or outside of the vehicle 201. The processor 120 (e.g., the position-tracking module 331 in FIG. 3) may receive position information of the vehicle 201 from a GPS receiver, may receive distance information or speed information from LIDAR, or may receive at least one type of position information of a surrounding vehicle from another electronic device (e.g., another vehicle, road infrastructure, and a mobile device of another vehicle). The processor 120 may track (or acquire) position information of the vehicle 201, based on the received at least one type of information. The processor 120 may acquire position information (e.g., a current position) of the vehicle 201 in real time. As more types of information are received, the processor 120 may more accurately track (or identify) position information of the vehicle 201.

When the position information is received, the processor 120 may acquire HD map information or non-HD map information, which corresponds to the position information. The processor 120 may acquire HD map information or non-HD map information necessary for a route to a destination in real time or after the destination is set. The HD map information refers to a 3D map having precision at a centimeter (cm)-level, and may include information associated with an object on a road as three-dimensional digital information. The object may include at least one of lane-based road information, traffic light information, sign information, or building information. The processor 120 may acquire, from a memory (e.g., the memory 130 in FIG. 1), HD map information or non-HD map information corresponding to position information, or may receive, periodically or in real time, HD map information or non-HD map information from a position providing server (e.g., the server 108 in FIG. 1).

In operation 403, the processor 120 may determine whether HD map information has been acquired (or received). Unlike map information (e.g., non-HD map information and typical map information), HD map information may include various types of information based on lanes, and thus may enhance the accuracy of position information. However, there may be no HD map information according to a position, and it may be difficult to acquire HD map information in real time. When there is no HD map information, the processor 120 may acquire non-HD map information. When position information is received in operation 401, HD map information or non-HD map information may be acquired. The processor 120 may perform operation 405 when HD map information is acquired, and may perform operation 407 when HD map information is not acquired (e.g., when non-HD map information is acquired).

According to various embodiments, position accuracy may depend on whether HD map information is acquired. For example, in the situation (state) in which HD map information is acquired, the position accuracy may be high, and in the situation in which HD map information is not acquired, the position accuracy may be low. The processor 120 may determine, based on the position accuracy, a method for displaying information. For example, the method for displaying information is changed depending on the position accuracy, but may increase spatial accuracy, based on additionally acquired driver gaze information and lane information. The processor 120 may map, using HD map information, three-dimensional navigation information to an actual object (e.g., terrain, topographical feature) of the real world, and may display three-dimensional navigation information, based on gaze information of a driver and lane information. The processor 120 may display different amounts of information depending on methods for displaying the information. For example, the amount of three-dimensional navigation information displayed when the position accuracy is high may be larger than the amount of two-dimensional navigation information displayed when the position accuracy is low.

When HD map information has been acquired, in operation 405, the processor 120 may display 3D (or three-dimensional) navigation information. The situation (state) in which HD map information is acquired may be called "a first condition" or "high accuracy". The 3D navigation information may be information in which virtual three-dimensional graphic information for driving guidance is spatially matched to and displayed on an actual object in the real world by using the HD map information. The processor 120 may match three-dimensional graphic information to an actual object in the real world by using object information included in the HD map information. Alternatively, the 3D navigation information may be information in which graphic information is provided in three dimensions (or spatially) (or in a three-dimensional plane) including distance (depth) information (e.g., the z-axis) on a horizontal direction (e.g., the x-axis) and/or a vertical direction (e.g., the y-axis), and the graphic information is projected in different sizes (e.g., is subject to perspective projection) according to distance. The processor 120 may acquire, from the communication module 190, information on the distance between the vehicle and an actual object near the vehicle, measured by a sensor (e.g., LIDAR) disposed in the vehicle. Alternatively, the processor 120 may use the wireless communication module 351 to acquire, through V2X communication, information on the distance between the vehicle 201 and another vehicle or information on the distance between the vehicle 201 and an object. The processor 120 may match the three-dimensional navigation information to an actual object in the real world by using the HD map information and the distance information, and may display the same. In the three-dimensional navigation information, graphic information may be changed in real time and/or flexibly depending on the position change of the vehicle 201.

When HD map information is not acquired, in operation 407, the processor 120 may display 2D (or two-dimensional) navigation information. The situation (state) in which HD map information is not acquired may be called a "third condition" or "low accuracy". In the case of the third condition, the processor 120 may generate and display 2D navigation information. The 2D navigation information may be information in which virtual two-dimensional graphic information for driving guidance is planarly matched to and displayed on an actual object in the real world. The two-dimensional navigation information may be information in which virtual graphic information for driving guidance may be provided two-dimensionally (or planarly) (as a two-dimensional planar) in the horizontal (e.g., x-axis) and/or vertical (e.g., y-axis) directions, and the graphic information may be projected in the same size (e.g., may be subject to parallel projection). In the two-dimensional navigation information, graphic information may be changed in real time and/or flexibly depending on the position change of the vehicle 201.

According to various embodiments, when navigation information is required to be displayed at a position beyond a predetermined distance from the vehicle 201, a navigation information display error may increase. The processor 120 may display two-dimensional navigation information only at a position within the predetermined distance, and may not display the two-dimensional navigation information when a position is beyond the predetermined distance. According to various embodiments, when a lane can be recognized, the processor 120 may display 2D navigation information by using lane-based two-dimensional modeling. When a lane cannot be recognized, the processor 120 may display two-dimensional 2D navigation information by using road-based two-dimensional modeling.

Figure 4B:
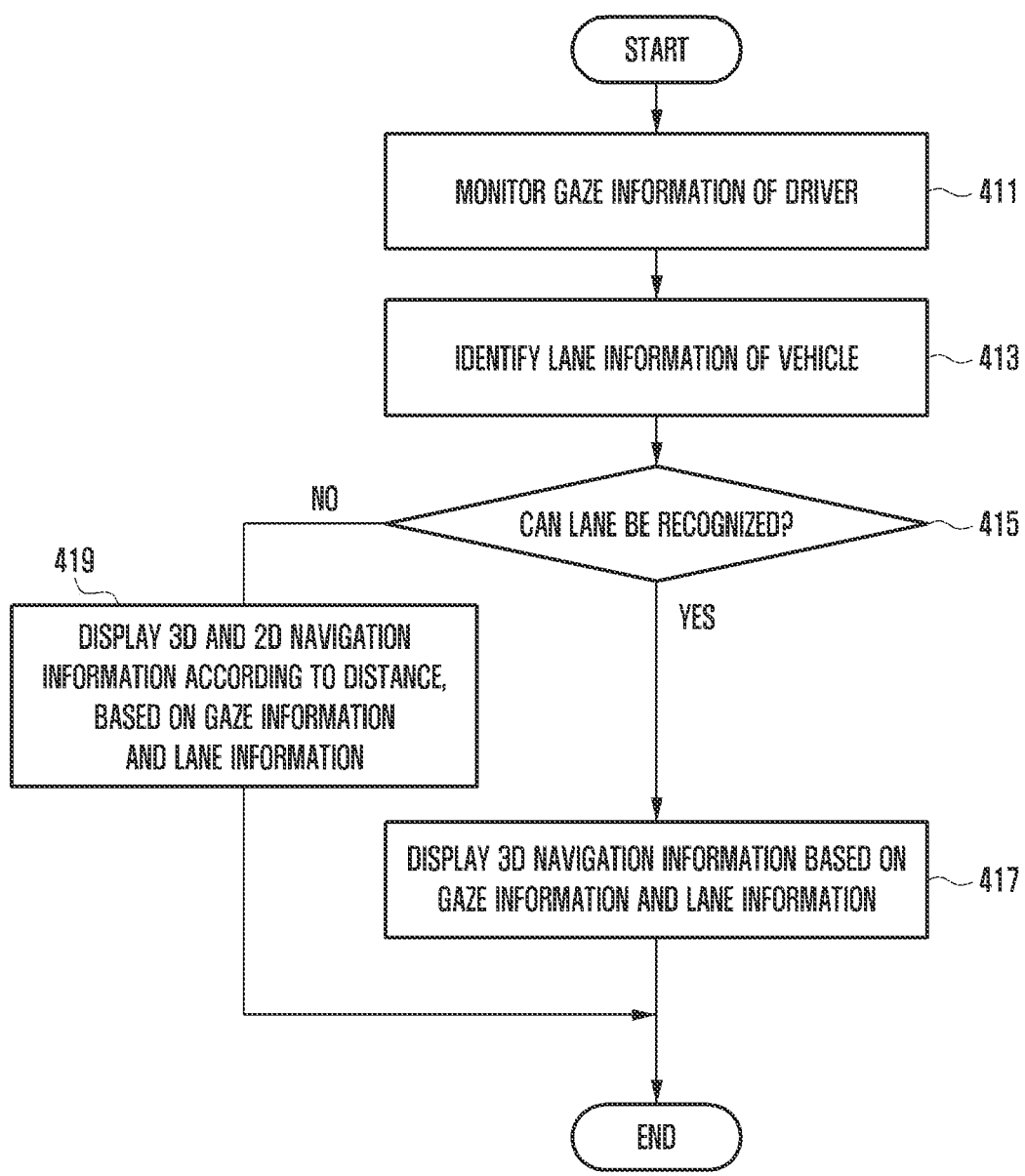
FIG. 4B is a flowchart illustrating an operation method of an electronic device according to an embodiment of the disclosure.

FIG. 4B is a flowchart illustrating an operation method of an electronic device according to an embodiment of the disclosure. FIG. 4B more specifically illustrates the operation performed when HD map information has been acquired in FIG. 4A.

Referring to FIG. 4B, in operation 411, the processor 120 may monitor gaze information of a driver. The processor 120 (e.g., the gaze-tracking module 333 in FIG. 3) may receive a driver image captured by a camera (e.g., the driver sensing module 230) disposed in the vehicle 201, and may acquire gaze information, based on the received driver image. The processor 120 may extract features from the driver image, and may analyze an eye feature of the driver among the extracted features. The processor 120 may track the driver's gaze direction by using the driver's eye feature. The processor 120 may receive steering angle information from a sensor (e.g., the vehicle information detection module 355) disposed inside or outside the vehicle, and may correct the driver's gaze direction, based on the steering angle information.

In operation 413, the processor 120 may identify lane information of a vehicle. The processor 120 (e.g., the lane recognition module 335 in FIG. 3) may acquire an image in front of the vehicle 201 from a sensor or a camera (e.g., the driving environment sensing module 210) disposed inside or outside the vehicle 201, and may extract features from the acquired image in front of the vehicle 201 to recognize lane information. The processor 120 may acquire lane information from the vehicle information detection module 355, may acquire HID map information from the map information acquisition module 353, and may recognize (or correct) lane information, based on the acquired lane information and the acquired HD map information.

In operation 415, the processor 120 may determine whether a lane is recognized (or identified). In the case in which navigation information is displayed based on HD map information, an error may occur in displaying navigation information according to a lane or the direction of a driver's gaze. In order to reduce an information display error, the processor 120 may display different types of navigation information according to when a lane is identified and when a lane is not identified. The processor 120 may perform operation 417 when a lane is identified, and may perform operation 419 when a lane is not identified.

When the lane is identified, in operation 417, the processor 120 may control, based on gaze information and lane information, displaying of 3D (or three-dimensional) navigation information. The processor 120 may display three-dimensional navigation information, based on at least one of gaze information and lane information. The situation in which HD map information is acquired and a lane is identified may be called a first condition or high accuracy. In the case of the first condition, the processor 120 may calculate, based on gaze information and lane information, an angle (e.g., a horizontal and/or vertical direction) and a distance (e.g., a depth direction) for displaying navigation information, and may determine, based on the calculated angle and depth, a display position of 3D navigation information. The processor 120 may display the 3D navigation information in augmented reality at the display position.

When the lane is not identified, in operation 419, the processor 120 may display, based on gaze information, 2D and 3D navigation information according to a distance. An error may occur in displaying navigation information based on gaze information or lane information, and as the distance increases, the error may become larger if the navigation information is displayed in augmented reality. The larger the distance becomes, the smaller the significance of a Z value (e.g., distance information) becomes. Thus, when position accuracy is reduced, displaying navigation information corresponding to the remote distance as 2D may reduce a display error. The situation in which HD map information is acquired but a lane is not identified may be called a second condition or intermediate accuracy. In the case of the second condition, the processor 120 may display two-dimensional navigation information and three-dimensional navigation information together according to a distance. For example, the processor 120 may generate 3D navigation information when the distance is within a predetermined distance (e.g., 3 m, 5 m, or 10 m) from the current position of the vehicle 201, and may generate 2D navigation information when the distance is beyond the predetermined distance. The processor 120 may display 3D navigation information corresponding to a first distance (e.g., a predetermined distance) from the current position of the vehicle 201, and may display 2D navigation information corresponding to a second distance (e.g., a distance beyond the predetermined distance).

According to various embodiments, the processor 120 may set a predetermined distance (or depth) according to which information is to be differently displayed, based on at least one among the type of road on which the vehicle 201 drives, a crossroads, a driving environment, or a speed. For example, the processor 120 may set the predetermined distance to 30 m for an expressway and to 10 m for a national road. The processor 120 may set the predetermined distance to 20 m when many objects are in HD map information and to a value greater than 20 m when few objects are in the HD map information. The processor 120 may set the distance to 10 m in the case of being adjacent to a crossroads and to 20 m in the case of being not adjacent to a crossroads. Alternatively, the processor 120 may set the predetermined distance to a large value (e.g., 30 m) when the speed of the vehicle 201 is high (e.g., exceeds 100 km/h) and to a small vale (e.g., 10 m) when the speed of the vehicle 201 is low (e.g., equal to or less than 50 km/h). In comprehensive consideration of a road type, a crossroads, a driving environment, or a speed, the processor 120 may set a predetermined distance (or depth) according to which information is to be differently displayed.

Figure 5B:
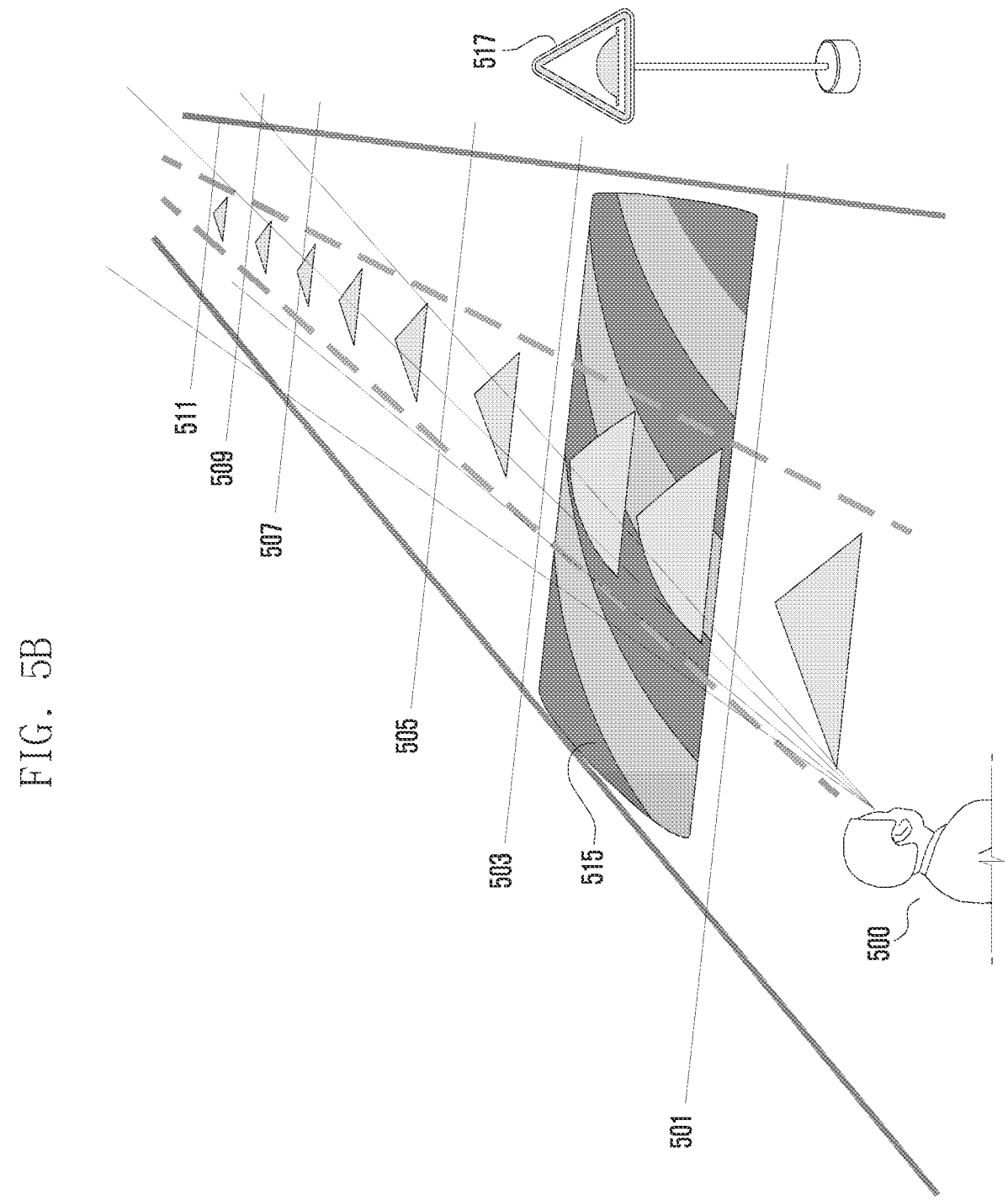
FIG. 5B illustrates a navigation information display point based on a user's gaze according to an embodiment of the disclosure.
Figure 5C:
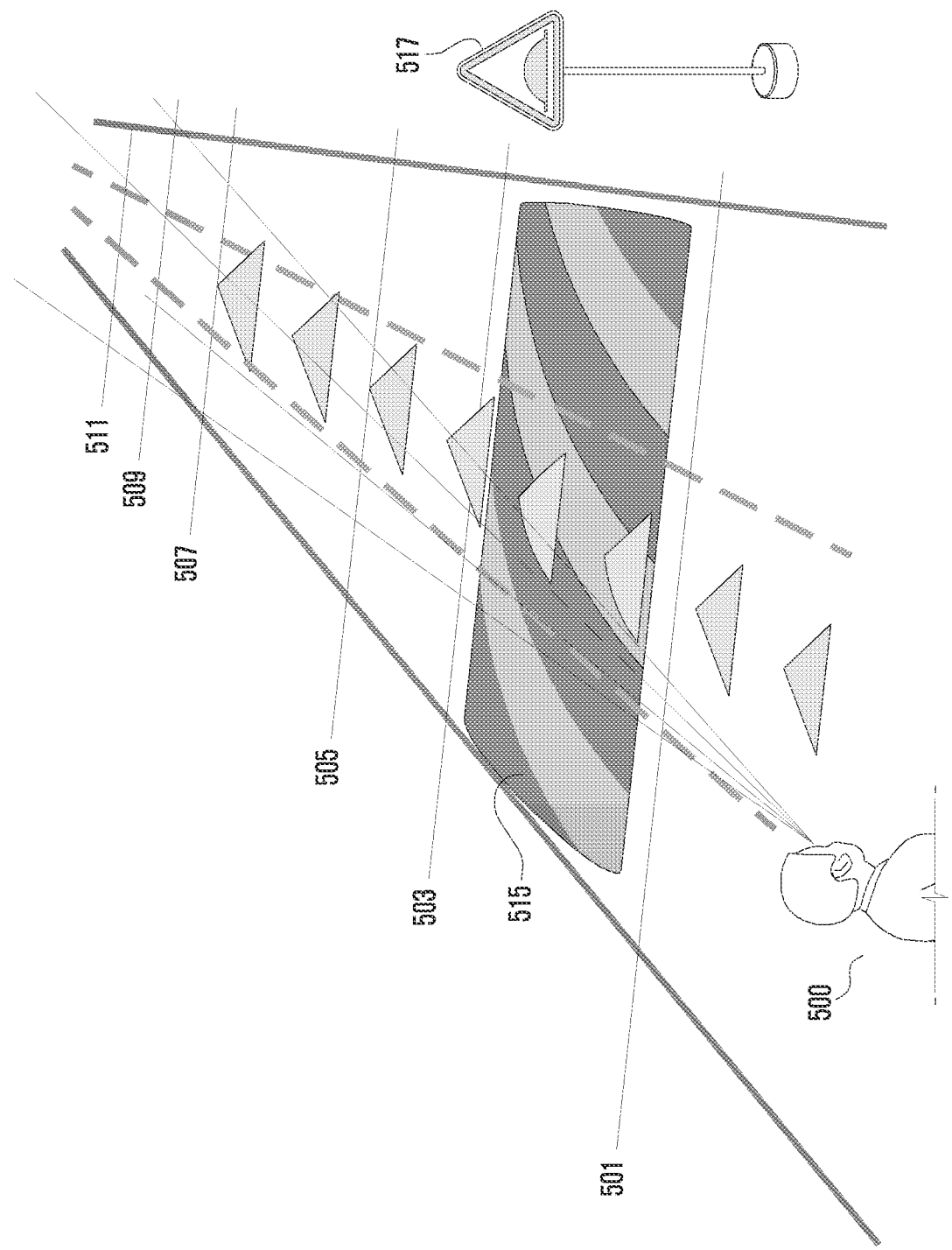
FIG. 5C illustrates a navigation information display point based on a user's gaze according to an embodiment of the disclosure.
Figure 5D:
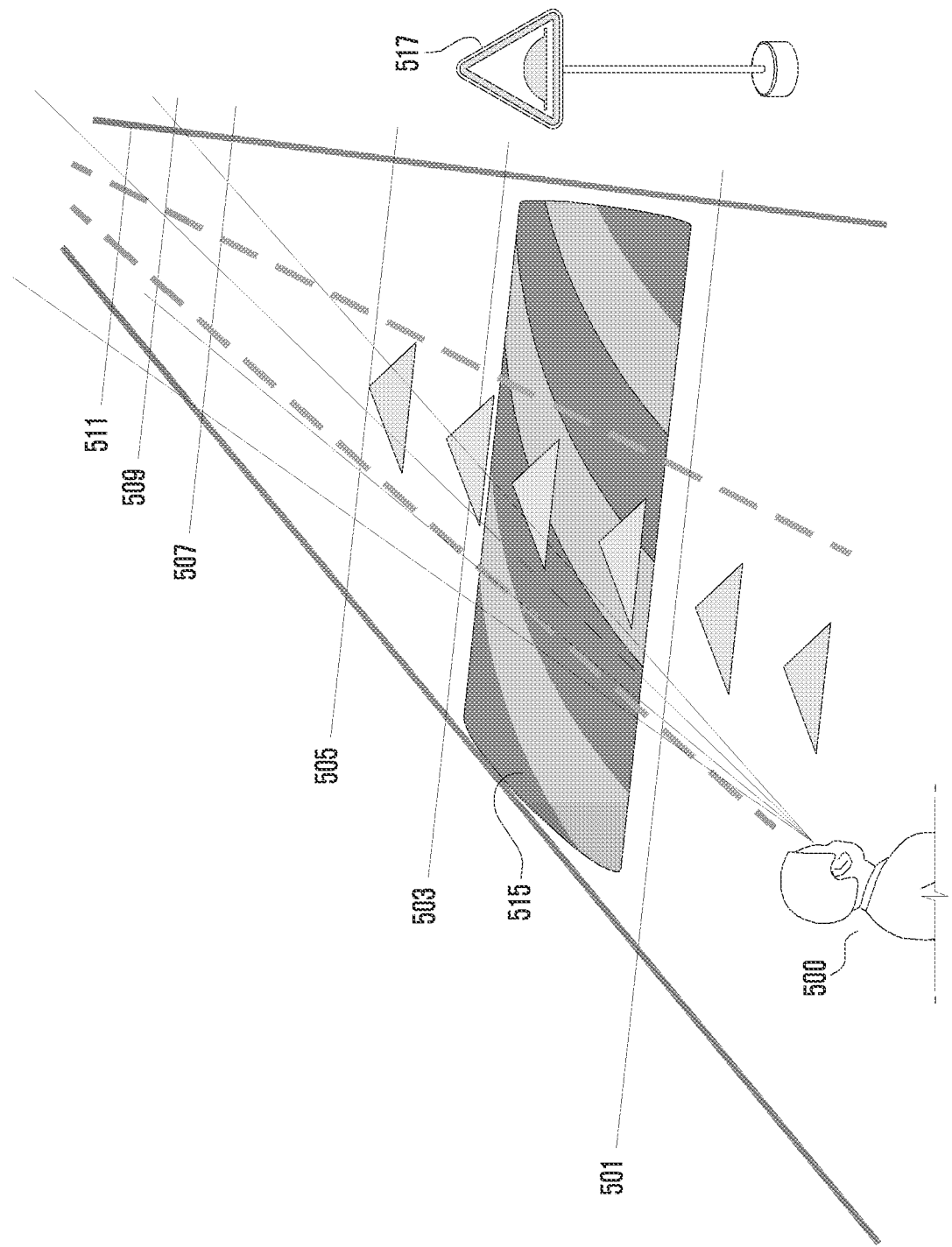
FIG. 5D illustrates a navigation information display point based on a user's gaze according to an embodiment of the disclosure.

FIG. 5A illustrates a navigation information display point based on a user's gaze according to an embodiment of the disclosure, FIG. 5B illustrates a navigation information display point based on a user's gaze according to an embodiment of the disclosure, FIG. 5C illustrates a navigation information display point based on a user's gaze according to an embodiment of the disclosure, and FIG. 5D illustrates a navigation information display point based on a user's gaze according to an embodiment of the disclosure.

FIG. 5A illustrates a navigation information display point based on a user's gaze according to an embodiment of the disclosure.

Referring to FIG. 5A, a processor (e.g., the processor 120 in FIG. 1) of an electronic device (e.g., the electronic device 101 in FIG. 1) according to various embodiments may control displaying of navigation information, based on the position of a vehicle (e.g., the vehicle 201 in FIGS. 2A and 2B) or a gaze of a driver 500 in the vehicle 201. For example, the processor 120 may differentiate, based on a distance away from the vehicle 201 (e.g., forward/backward, and depth directions), between positions at which navigation information is displayed (e.g., a first display position 501 to a sixth display position 511). For example, the first display position 501 is a minimum distance at which navigation information can be overlaid and displayed, and may correspond to, for example, the windshield of the vehicle 201. The second display position 503 may be a point at which navigation information can be displayed on the ground (e.g., a road). The third display position 505 may be a point showing a single lane on navigation information. The fourth display position 507 may be a point showing a notification of a left or right turn on navigation information. The fifth display position 509 may be a point showing two lanes on navigation information. The sixth display position 511 may be a maximum distance at which navigation information can be overlaid and displayed.

FIG. 5B illustrates an example of displaying 3D navigation information according to an embodiment of the disclosure.

Referring to FIG. 5B, the processor 120 may display three-dimensional navigation information (e.g., triangular arrows) from the current position of the vehicle 201 to the sixth display position 511 that is a maximum distance at which navigation information can be overlaid and displayed. The three-dimensional navigation information may be information in which virtual three-dimensional graphic information for driving guidance is spatially matched to and displayed on an actual object in the real world by using HID map information. The three-dimensional navigation information may be provided three-dimensionally such that virtual graphic information for driving guidance includes distance information in the horizontal and/or vertical directions. The three-dimensional navigation information is information in which graphic information may be displayed to be smaller as the distance away from the vehicle 201 becomes larger.

For example, the processor 120 may acquire HD map information corresponding to position information of the vehicle 201, and, when gaze information and lane information are acquired, may determine that position accuracy is high. When the position accuracy is high, the processor 120 may display 3D navigation information in accordance with a lane, and may display an indicator (e.g., an arrow) indicating a direction in the middle of the lane. When turn information (e.g., a right turn, a left turn, and a U-turn) is included on a route to a destination, the direction indicator may be displayed.

The three-dimensional navigation information is overlaid and displayed on a road, and thus a display position may vary depending on a road situation. For example, when there is a speed bump 515 on a road, the processor 120 may perform control such that three-dimensional navigation information is displayed based on the inclined angle of the speed bump 515. Further, the processor 120 may include sign information 517 related to the speed bump 515 in three-dimensional navigation information and may provide the three-dimensional navigation information. The sign information 517 may include at least one of a text, an image (e.g., a sign icon), or a video about the speed bump 515.

FIG. 5C illustrates an example of displaying 3D and 2D navigation information according to an embodiment of the disclosure.

Referring to FIG. 5C, the processor 120 may display three-dimensional and two-dimensional navigation information (e.g., triangular arrows) from the current position of the vehicle 201 to the fourth display position 507. The three-dimensional and two-dimensional navigation information may be information in which three-dimensional navigation information is displayed up to third display position 505 and two-dimensional navigation information is displayed from the third display position 505 to the fourth display position 507. The larger the distance from the current position of the vehicle 201 becomes, the smaller the significance of a Z value (e.g., distance information) becomes. Thus, when position accuracy is reduced, two-dimensional navigation information may be displayed to correspond to the distance far from the vehicle 201, and thus a display error may be reduced. When the distance from the current position of the vehicle 201 to the third display position 505 is very short, the field of view of a driver may cover a lane in a large range, and thus may be less affected by position accuracy. The processor 120 may display, based on gaze information of the driver, three-dimensional navigation information corresponding to a distance close to the vehicle 201 and two-dimensional navigation information corresponding to a distance far from the vehicle 201 with reference to the middle of a lane.

For example, when the processor 120 has acquired HD map information and gaze information, corresponding to position information of the vehicle 201, but has not acquired lane information, the processor 120 may determine that position accuracy is intermediate. When the position accuracy is intermediate, the processor 120 may display 3D navigation information at the center of the field of view of a driver on the assumption that the driver drives the vehicle 201 in the driving direction toward a destination, and may display an indicator indicating a direction (e.g., an arrow). The direction indicator may be displayed three-dimensionally or two-dimensionally according to a distance away from the vehicle 201.

According to various embodiments, three-dimensional navigation information is displayed up to the third display position 505, and thus, when there is a speed bump 515 on a road from the current position of the vehicle 201 to the third display position 505, the processor 120 may perform control such that three-dimensional navigation information is displayed based on the inclined angle of the speed bump 515. Further, the processor 120 may include the sign information 517 related to the speed bump 515 in three-dimensional navigation information and may provide the three-dimensional navigation information. The processor 120 may display navigation information, which is to be displayed at a position beyond the fourth display position 507, as two-dimensional navigation information on a vertical plane at the fourth display position 507.

FIG. 5D illustrates an example of displaying 2D navigation information according to an embodiment of the disclosure.

Referring to FIG. 5D, the processor 120 may display two-dimensional navigation information (e.g., triangular arrows) from the current position of the vehicle 201 to the third display position 505. The two-dimensional navigation information may be information in which virtual two-dimensional graphic information for driving guidance is planarly matched to and displayed on an actual object in the real world. In the two-dimensional navigation information, the virtual graphic information for driving guidance may be provided two-dimensionally in the horizontal and/or vertical directions, and the graphic information may be projected in the same size (e.g., may be subject to parallel projection). In the case of the two-dimensional navigation information, position accuracy is low, and thus a distance at which graphic information is displayed may be short compared with the case of three-dimensional navigation information. For example, the two-dimensional navigation information may be information in which the graphic information is displayed in a predetermined size even though a distance from the vehicle 201 becomes larger. The two-dimensional navigation information may not display the sign information 517 related to the speed bump 515. Alternatively, unlike the three-dimensional navigation information, the two-dimensional navigation information may be information in which graphic information is displayed regardless of the inclined angle of the speed bump 515.

For example, when gaze information or lane information is acquired but HD map information corresponding to position information of the vehicle 201 is not acquired, the processor 120 may determine that position accuracy is low. When the position accuracy is low, the processor 120 may display 3D navigation information at the center of the field of view of a driver on the assumption that the driver drives the vehicle 201 in the driving direction toward a destination, and may display an indicator indicating a direction (e.g., an arrow).

Figure 6A:
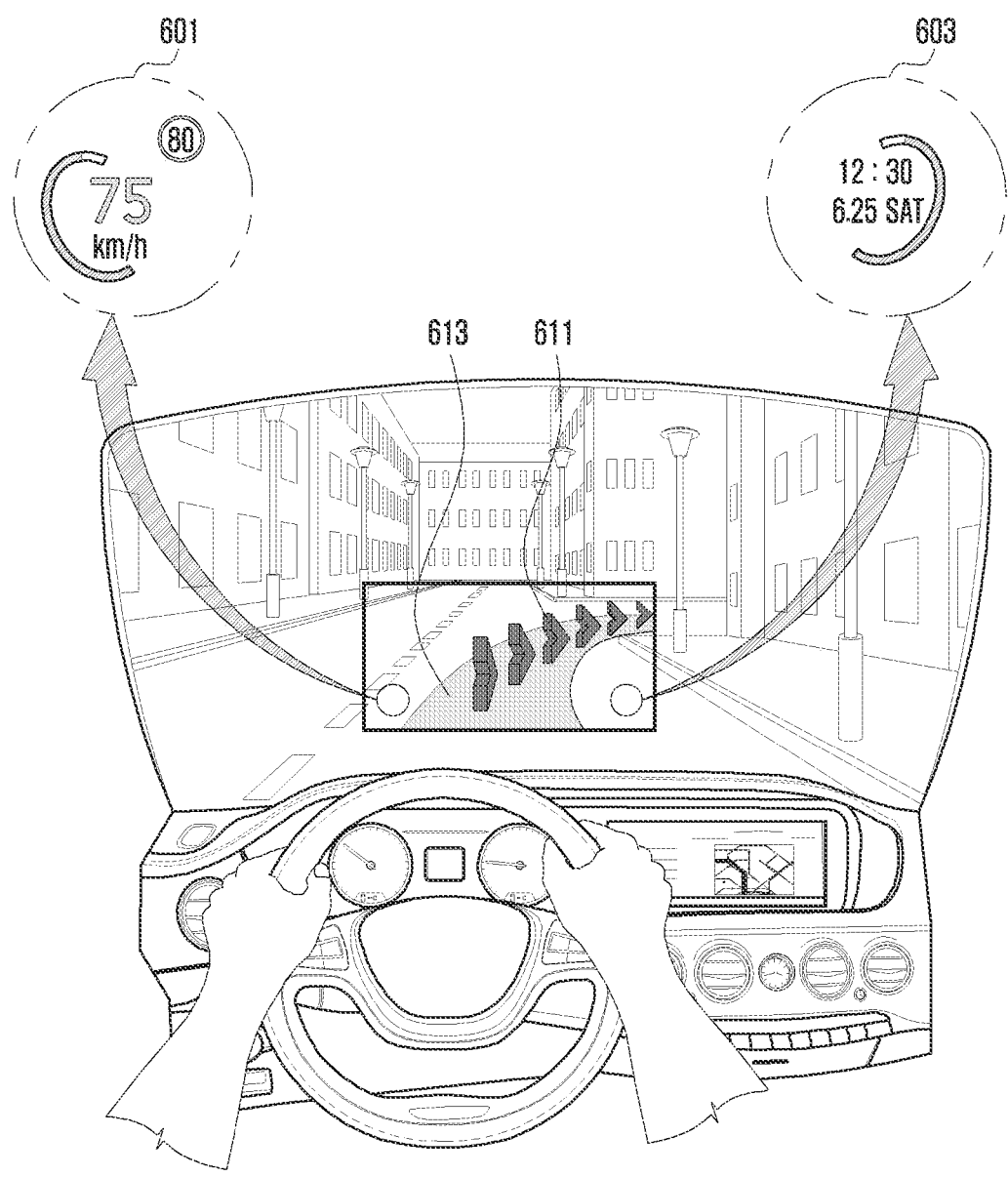
FIG. 6A illustrates an example of navigation information according to an embodiment of the disclosure.
Figure 6B:
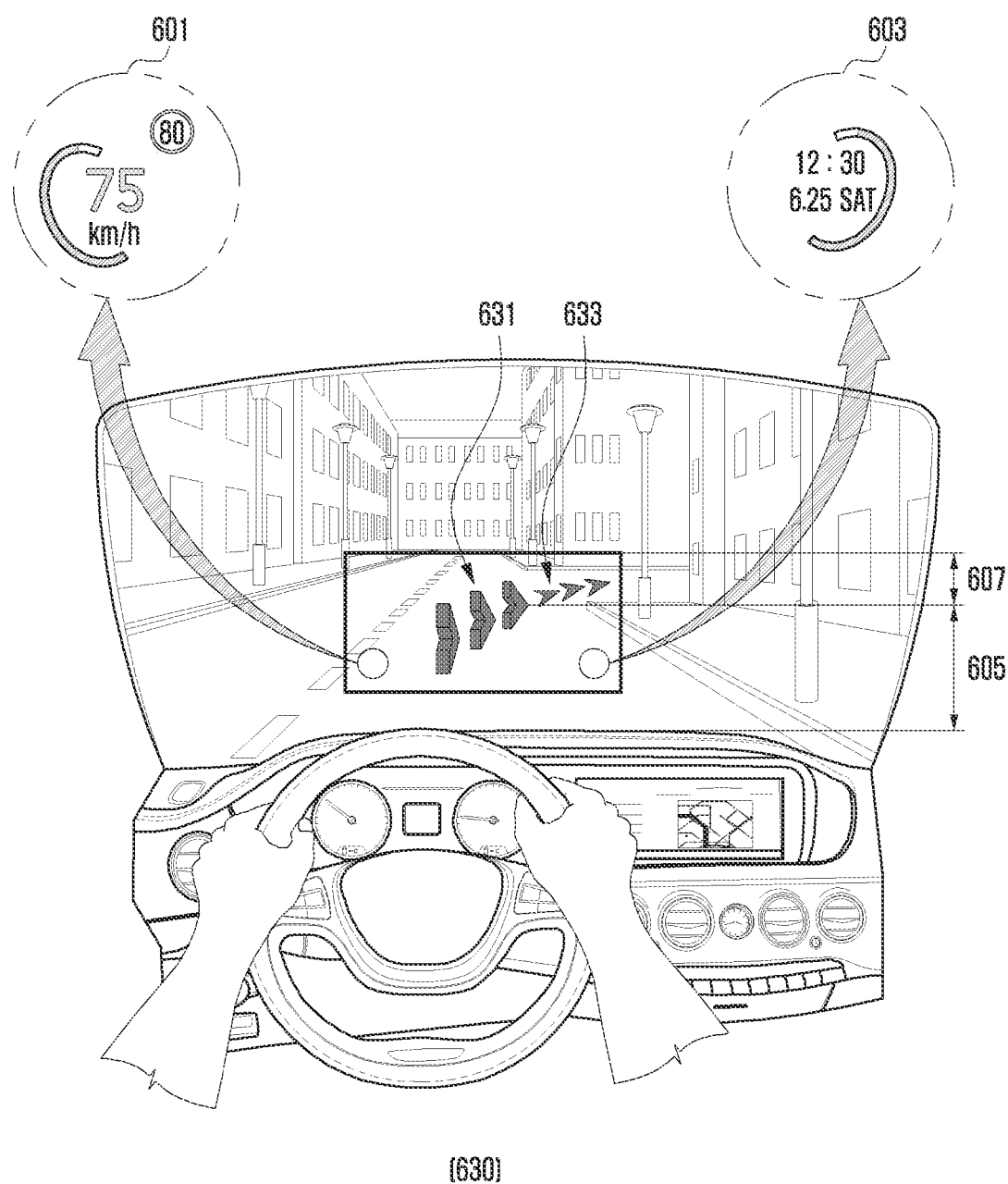
FIG. 6B illustrates an example of navigation information according to an embodiment of the disclosure.
Figure 6C:
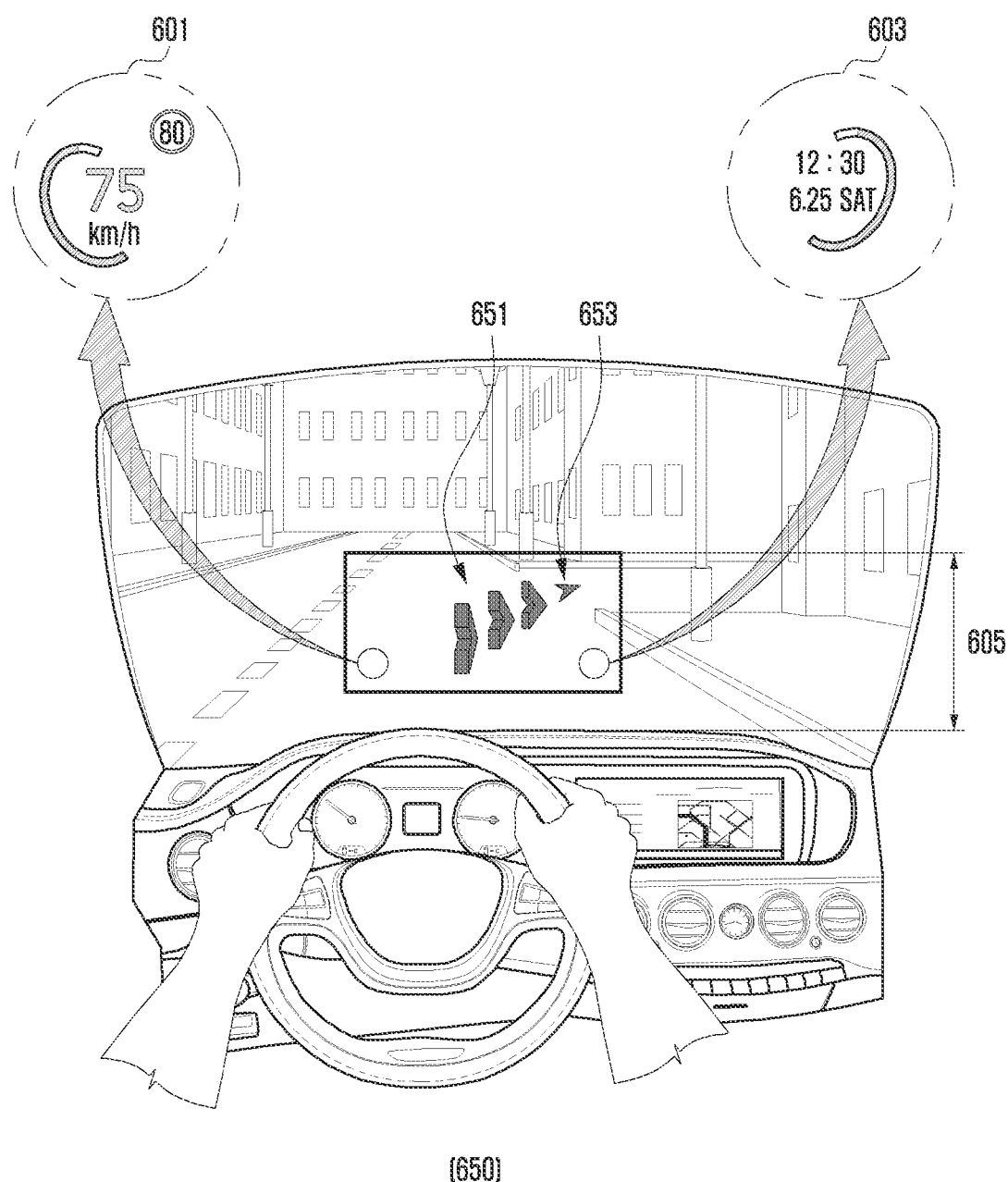
FIG. 6C illustrates an example of navigation information according to an embodiment of the disclosure.
Figure 6D:
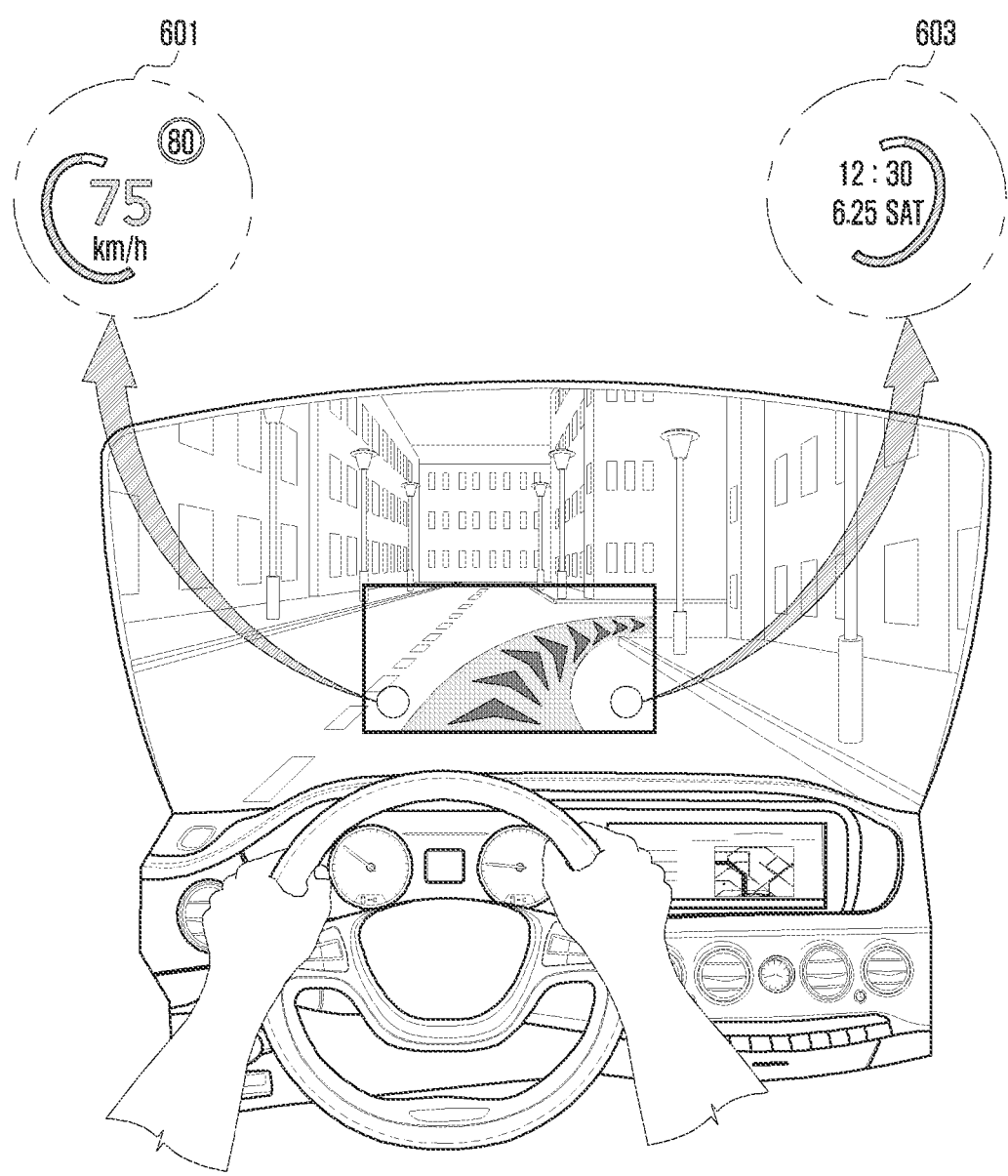
FIG. 6D illustrates an example of navigation information according to an embodiment of the disclosure.

FIG. 6A illustrates an example of navigation information according to an embodiment of the disclosure, FIG. 6B illustrates an example of navigation information according to an embodiment of the disclosure, FIG. 6C illustrates an example of navigation information according to an embodiment of the disclosure, and FIG. 6D illustrates an example of navigation information according to an embodiment of the disclosure.

FIG. 6A illustrates an example of showing 3D navigation information according to an embodiment of the disclosure.

Referring to FIG. 6A, a processor (e.g., the processor 120 in FIG. 1) of an electronic device (e.g., the electronic device 101 in FIG. 1) according to various embodiments may generate 3D navigation information 610, based on HD map information corresponding to position information. When HD map information is acquired and a lane is recognized (e.g., a first condition), the processor 120 may generate the 3D navigation information 610. The 3D navigation information 610 may include a first region 601 or a second region 603 for displaying (or showing) speed information of a vehicle (e.g., the vehicle 201 in FIGS. 2A and 2B), turn information, or time information. For example, the processor 120 may display speed information of the vehicle 201 in the first region 601, and may display turn information in the second region 603. The speed information, which includes the current speed or regulated speed of the vehicle 201, may include a text, an image (e.g., an icon), or a video. The turn information, which includes a left turn, a right turn, a U-turn, or a distance until a turn, may include a text, an image (e.g., an icon), or a video.

Further, the 3D navigation information 610 may include various types of navigation information (e.g., first 3D information 613 and second 3D information 611) which is to be displayed in a third region 605 (e.g., a second display position (e.g., the second display position 503 and the fourth display position 507 in FIG. 5)) and a fourth region 607 (e.g., the fourth display position 507 to the sixth display position 511). The 3D navigation information 610 may be provided three-dimensionally such that virtual graphic information for driving guidance includes distance information in the horizontal and/or vertical directions. The 3D navigation information 610 may be information in which graphic information is overlaid and displayed in the form of a dot, a line, a surface, or a figure on an object included in HD map information. The 3D navigation information 610 may show graphic information in the form of at least one of a text, an image, or a video.

For example, the processor 120 may display the first 3D information 613 and the second 3D information 611, based on a lane of the vehicle 201 or the direction of a gaze of a driver in the vehicle 201. For example, the processor 120 may display, at the second display position 503 and the third display position 505, the first 3D information 613 having the form of a carpet that seems to be attached to the ground (e.g., a lane). In the first 3D information 613, graphic information may be displayed in the form of a surface. Further, the processor 120 may display, at the second display position 503 to the fifth display position 509, the second 3D information 611 having the form of arrows that appear to float above the ground. In the second 3D information 611, graphic information may be displayed in the form of a figure (e.g., in an arrow shape).

According to various embodiments, the processor 120 may track a driver's gaze and a lane of the vehicle 201 according to a position change of the vehicle 201, may calculate, based on the tracked gaze and lane, an angle and a distance for displaying 3D navigation information, and may determine, based on the calculated angle and distance, a display position of the 3D navigation information. In order to reduce a display error, the lane may be displayed to be narrower or wider than a lane in HD map information. The transparency, gradation, or distance (or size (or width)) with regard to distance) of the first 3D information 613 or the second 3D information 611 may change depending on a position change of the vehicle 201 (e.g., a distance change). The first 3D information 613 or the second 3D information 611 may be information in which graphic information is mapped to actual objects (e.g., a sign, a hill, a slope, a curve) of the real world and is displayed in augmented reality. The processor 120 may change and display the 3D navigation information 610 depending on the position change of the vehicle 201. For example, as the vehicle 201 becomes closer, the 3D navigation information 610 may be displayed larger, and as the vehicle 201 becomes more distant, the 3D navigation information may be displayed smaller. The 3D navigation information 610 shows a sense of distance similar to a real distance, and the processor 120 may change and display the 3D navigation information 610, depending on the direction of a driver's gaze.

FIG. 6B illustrates an example of showing 3D and 2D navigation information according to an embodiment of the disclosure.

Referring to FIG. 6B, the processor 120 may generate 3D and 2D navigation information 630, based on HID map information corresponding to position information. When HD map information is acquired but a lane is not recognized (e.g., the second condition), the processor 120 may generate the 3D and 2D navigation information 630. The 3D and 2D navigation information 630 may be information in which first 3D navigation information 631 is displayed in the third region 605 and first 2D navigation information 633 is displayed in the fourth region 607. The 3D and 2D navigation information 630 may include, at the first display position 501, a first region 601 or a second region 603 for displaying speed information of the vehicle 201, turn information, or time information. The first region 601 and the second region 603 are identical or similar to those of FIG. 6A, and thus a detailed description thereof will be omitted.

The first 3D navigation information 631 may be information in which graphic information is overlaid and displayed in the form of a dot, a line, a surface, or a figure on an object included in HD map information. The first 3D navigation information 631 may be provided three-dimensionally such that the graphic information includes distance (depth) information in the horizontal and/or vertical directions, and may be information in which the graphic information is projected in different sizes (e.g., is subject to perspective projection) according to distance. The first 2D navigation information 633 may be provided in two dimensions (or planarly) (or in a two-dimensional plane) which is configured in the form of a dot, a line, a surface, or a figure, and the graphic information is projected in the same size (e.g., is subject to parallel projection).

According to various embodiments, a display error of navigation information may become larger as the distance (e.g., a Z value) becomes larger. Therefore, when position accuracy is decreased, displaying navigation information corresponding to a remote distance as 2D may reduce a display error. The processor 120 may display the first 3D navigation information 631 with respect to a distance close to the vehicle 201 and the first 2D navigation information 633 with respect to a distance far from the vehicle 201. For example, the processor 120 may generate the first 3D navigation information 631 corresponding to the third region 605 (e.g., the first display position 501 to the third display position 505), and may generate first 2D navigation information 633 corresponding to the fourth region 607 (e.g., the third display position 505 to fourth display position 507).

For example, the first 2D navigation information 633 may be information in which navigation information to be displayed in the fourth region 607 is displayed on a plane at the fourth display position 507 (a plane perpendicular to the ground). For example, the navigation information to be displayed in the fourth region 607 may be arrow figures which guide the driving direction (e.g., forward direction) of the vehicle 201. The processor 120 may display the first 2D navigation information 633 such that the arrow figures are displayed on a vertical plane at the fourth display position 507. The arrow figures may be displayed in the state of floating above the ground at the fourth display position 507. The first 2D navigation information 633 may be information in which three arrow figures are displayed in the same size or in different sizes on a plane at the fourth display position 507.

When the 3D and 2D navigation information 630 is compared with the 3D navigation information 610 in FIG. 6A, the third region 605 of the 3D navigation information 610 may be identical or similar to the first 3D navigation information 631. As in or similarly to 3D navigation information 610, the processor 120 may generate the first 3D navigation information 631 with respect to the third region 605 positioned at a short distance from the vehicle 201. The fourth region 607 of the 3D navigation information 610 may differ from the first 2D navigation information 633. In the fourth region 607 of the 3D navigation information 610, the display positions of arrow figures may vary depending on a distance from the vehicle 201. In the first 2D navigation information 633 corresponding to the fourth region 607 of the 3D navigation information 610, the display position of arrow figures may not vary depending on a distance The first 2D navigation information 633 does not include distance information (e.g., a z-value), and thus virtual graphic information may be provided two-dimensionally in the horizontal and/or vertical directions.

According to various embodiments, the processor 120 may determine, based on at least one of the type of road on which the vehicle 201 drives, a crossroads, a driving environment, or a speed, a display position at which the first 2D navigation information 633 is to be displayed. In the above description, the fourth display position 507 has been described as the display position at which the first 2D navigation information 633 is to be displayed. However, the display position at which the first 2D navigation information 633 is to be displayed may be one of the third display position 505, the fifth display position 509, or the sixth display position 511. For example, the processor 120 may configure the display position to be long in an expressway, and may configure the display position to be short in a national road. Alternatively, the processor 120 may configure the display position to be short when many objects are included in HD map information, and may configure the display position to be long when few objects are included in the HD map information. The processor 120 may configure the display position to be short when the vehicle 201 is adjacent to a crossroads, and may configure the display position to be long when the vehicle 201 is not adjacent to a crossroads. Alternatively, the processor 120 may configure the display position to be short when the speed of the vehicle 201 is high (e.g., exceeds 100K m/h), and may configure the display position to be long when the speed of the vehicle 201 is low (e.g., is equal to or less than 50 km/h). The examples described above are presented in order to aid in understanding of the disclosure, and the disclosure is not limited to the description.

FIG. 6C illustrates another example of showing 3D and 2D navigation information according to an embodiment of the disclosure.

Referring to FIG. 6C, the processor 120 may generate 3D and 2D navigation information 650, based on HD map information corresponding to position information. When HD map information is acquired but a lane is not recognized (e.g., the second condition), the processor 120 may generate the 3D and 2D navigation information 650. When displaying the 3D and 2D navigation information 630 in FIG. 6B, the processor 120 may change and display 3D and 2D navigation information 650, depending on a position change of the vehicle 201. When a turn point (e.g., a right turn, a left turn, or a U-turn) is included in the third region 605 by the position change of the vehicle 201, the processor 120 may generate second 3D navigation information 651 from the first display position 501 to the third display position 505, and may generate second 2D navigation information 653 with respect to navigation information beyond the third display position 505. The second 2D navigation information 653 may be information in which navigation information is overlaid and displayed on the ground (e.g., a road). The third display position 505 may be a position at which the vehicle 201 is required to make a turn (e.g., a right turn or a left turn). When the vehicle 201 is required to make a turn in the third region 605, the processor 120 may display the first 2D navigation information 633 even when the vehicle 201 does not leave the third region 605.

When FIGS. 6B and 6C are compared with each other, at the time of displaying 3D and 2D navigation information, the processor 120 may change, based on a position change of the vehicle 201, display positions of 3D navigation information and 2D navigation information. For example, the display positions of the first 3D navigation information 631 and the first 2D navigation information 633, included in the 3D and 2D navigation information 630, may be different from the display positions of the second 3D navigation information 651 and the second 2D navigation information 653, included in the 3D and 2D navigation information 650. When a turn point is included in the third region 605 by the position change of the vehicle 201, the processor 120 may change the display position of the second 2D navigation information 653. When the vehicle 201 approaches the turn point, the processor 120 may display 3D navigation information.

FIG. 6D illustrates an example of showing 2D navigation information according to an embodiment of the disclosure.

Referring to FIG. 6D, the processor 120 may generate 2D navigation information 670. When HD map information is not acquired (e.g., the third condition), the processor 120 may generate the 2D navigation information 670. The 2D navigation information 670 may include a first region 601 or a second region 603 for displaying speed information of the vehicle 201, turn information, or time information. The first region 601 and the second region 603 are identical or similar to those of FIG. 6A, and thus a detailed description thereof will be omitted. The 2D navigation information 670 may be information in which virtual graphic information for driving guidance is provided two-dimensionally in the horizontal and/or vertical directions, and the graphic information is projected in the same size (e.g., is subject to parallel projection). The 2D navigation information 670 does not include distance information, and thus information for guiding a driver's driving in a two-dimensional plane may be displayed. The processor 120 may generate the 2D navigation information 670 corresponding to a predetermined distance (e.g., third region 605), and may not generate navigation information when a distance is beyond the predetermined distance (e.g., the fourth region 607). For example, the processor 120 may display only the 2D navigation information 670 corresponding to a short distance (e.g., the third region 605), and may not display navigation information corresponding to a remote distance (e.g., the fourth region 607). The processor 120 may display the 2D navigation information 670, based on a lane of the vehicle 201 and a driver's gaze.

According to various embodiments, when the third region 605 or the fourth region 607 is a straight section, the processor 120 may also display the 2D navigation information 670 corresponding to the fourth region 607. The processor 120 may generate the 2D navigation information 670 by changing transparency or gradation according to a change related to the vehicle 201 (e.g., a distance change). When curvature information or spline information is acquired, the processor 120 may generate three-dimensional navigation information with a predetermined region (e.g., the third region 605).

According to various embodiments, when a lane can be identified, the processor 120 may display the 2D navigation information 670 which guides, based on the driving angle of the vehicle 201, a lane movement when the vehicle 201 moves out of a lane or drifts over a lane boundary. The processor 120 may display the 2D navigation information 670 which guides turn information (e.g., a left turn, a right turn, or a U-turn). When the vehicle 201 approaches a turn (turn direction) point, the processor 120 may gradually add, based on a position change of the vehicle 201, a three-dimensional element or may display a direction two-dimensionally. For example, as the vehicle 201 gets nearer to a turn point, the processor 120 may display arrow figures to gradually become larger.

Figure 7:
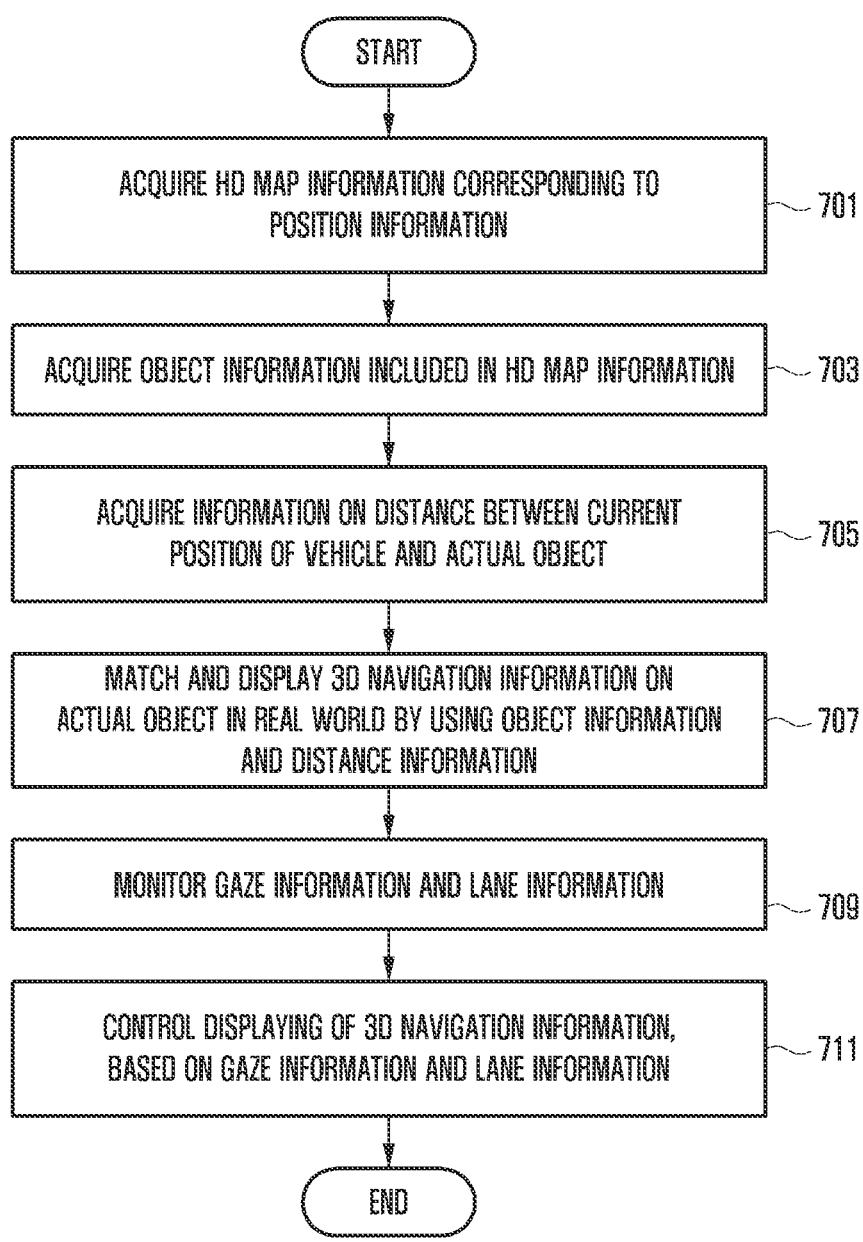
FIG. 7 is a flowchart illustrating a method for displaying three-dimensional (3D) navigation information by an electronic device according to an embodiment of the disclosure.

FIG. 7 is a flowchart illustrating a method for displaying 3D AR navigation information by an electronic device according to an embodiment of the disclosure. FIG. 7 shows operations performed when HD map information is acquired and a lane is identified (e.g., in the case of the first condition).

Referring to FIG. 7, in operation 701, a processor (e.g., the processor 120 in FIG. 1) of an electronic device (e.g., the electronic device 101 in FIG. 1) according to various embodiments may acquire HD map information corresponding to position information of the vehicle 201. The HD map information refers to a 3D map having precision at a centimeter (cm)-level, and may include information associated with an object on a road as three-dimensional digital information. The processor 120 may extract, based on information on the current position of a vehicle (e.g., the vehicle 201 in FIGS. 2A and 2B), HD map information stored in a memory (e.g., the memory 130 in FIG. 1). Alternatively, the processor 120 may transmit, periodically or in real time, a signal or the information on the current position of the vehicle 201 to a position providing server (e.g., the server 108 in FIG. 1), and may receive HD map information from the server 108.

In operation 703, the processor 120 may acquire object information included in the HD map information. The object information may include at least one of road information, traffic light information, sign information, or building information. The HD map information may further include lane information and local information, which are information necessary for vehicle movement, in addition to information for driving, for example, region position information, a sign, and a direction name. The processor 120 is required to acquire (or recognize) the object information in order to overlay and display navigation information.

In operation 705, the processor 120 may acquire information on a distance between the current position of a vehicle and an actual object. The actual object may correspond to an object (or the object information) included in the HD map information. In order to display navigation information three-dimensionally, distance information may be required. The information on the distance between the vehicle 201 and the actual object may be acquired from a sensor (e.g., LIDAR) disposed in the vehicle 201 or the wireless communication module 351 (e.g., V2X communication). The processor 120 may calculate the distance information by using the object information included in the HD map information. Alternatively, the processor 120 may calculate the distance information, based on the distance information acquired from the sensor or the wireless communication module 351 and the object information included in the HD map information.

In operation 707, the processor 120 may spatially match and display three-dimensional (or 3D) navigation information to and on an actual object in the real world by using the object information and the distance information. The processor 120 may generate 3D navigation information (e.g., the 3D navigation information 610 in FIG. 6A) such that the 3D navigation information is displayed in augmented reality on an actual object in the real world. The 3D navigation information may be information in which virtual three-dimensional graphic information for driving guidance is spatially matched to and displayed on an actual object in the real world. The 3D navigation information may be provided three-dimensionally such that the graphic information includes distance information in horizontal and/or vertical directions, and may be information in which the graphic information is projected in different sizes (e.g., is subject to perspective projection) according to distance. The graphic information may include at least one of a text, an image, or a video. For example, the processor 120 may display 3D navigation information such that a direction indicator is overlaid and displayed on a lane, a protective wall is overlaid and displayed on a boundary, or information such as the number of cars that can be parked and parking rates is displayed on a building.

In operation 709, the processor 120 may monitor gaze information and lane information. The processor 120 may receive information from a sensor or a camera, mounted inside or outside the vehicle 201, so as to monitor the gaze information and the lane information. For example, the processor 120 may collect, from the first information collection module 310 or the second information collection module 350, at least one of position information, speed information, direction information, or image information of the vehicle 201. The first information collection module 310 may include at least one of a GPS sensor (or a receiver), LIDAR, an acceleration sensor, a geomagnetic sensor, or a camera. The second information collection module 350 may include at least one of the wireless communication module 351, the map information acquisition module 353, or the vehicle information detection module 355.

According to various embodiments, the processor 120 may acquire an image in front of the vehicle 201, may extract features from the acquired image in front of the vehicle 201, and may recognize lane information. Alternatively, the processor 120 may acquire lane information from the vehicle information detection module 355, and may recognize (or correct) lane information, based on the acquired lane information and the HD map information. The processor 120 may receive a driver's face image from the driver sensing module 313, may extract features from the received face image, and may track the direction of the driver's gaze. The processor 120 may receive steering angle information from the vehicle information detection module 355, and may correct the direction of the driver's gaze, based on the steering angle information.

FIG. 7 illustrates that operation 709 is performed after operations 701 to 707 are performed. However, operation 709 may be performed in real time or periodically even while operations 701 to 707 are performed.

In operation 711, the processor 120 may control, based on the gaze information and the lane information, displaying of 3D navigation information. When information is displayed in augmented reality, a display error may occur according to whether a lane is identified or according to the direction of a driver's gaze. The 3D navigation information includes distance information, and thus may have a large display error according to a distance from the vehicle 201. The processor 120 may control the 3D navigation information, based on the gaze information and the lane information. For example, the processor 120 may track gaze information of the driver and lane information of the vehicle 201 according to a position change of the vehicle 201, and may calculate, based on the tracked gaze information and lane information, an angle and a distance for displaying navigation information. The processor 120 may control, based on the calculated angle and distance, displaying of 3D AR navigation information. For example, the processor 120 may map 3D navigation information to an actual object and may display the 3D navigation information in three-dimensional augmented reality. In order to reduce an error, the processor 120 may display the 3D navigation information to be narrower or wider than the lane width of a road. The processor 120 may change, according to a change related to the vehicle 201 (e.g., a distance change), the transparency, gradation, or distance (or size (or width) with regard to distance) of the 3D navigation information.

Figure 8A:
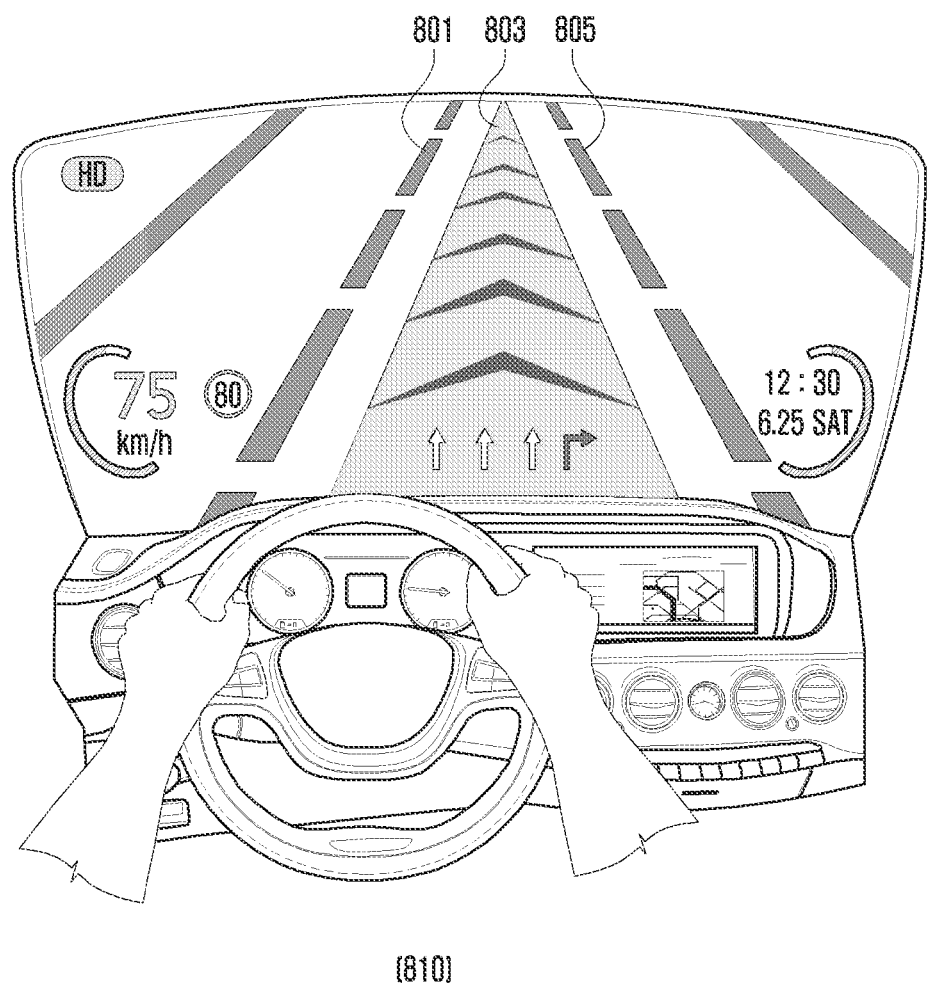
FIG. 8A illustrates an example of first 3D navigation information according to an embodiment of the disclosure.

FIG. 8A illustrates an example of first 3D navigation information according to an embodiment of the disclosure.

Referring to FIG. 8A, a processor (e.g., the processor 120 in FIG. 1) of an electronic device (e.g., the electronic device 101 in FIG. 1) according to various embodiments may display first 3D navigation information 810 in the case of the first condition (e.g., when HD map information is acquired and a lane is recognized). The processor 120 may spatially match and display the first 3D navigation information 810 to and on an actual object in the real world, based on position information of a vehicle (e.g., the vehicle 201 in FIGS. 2A and 2B), gaze information of a driver in the vehicle 201, and lane information (e.g., a first lane 801 and a second lane 805). The first 3D navigation information 810 may include graphic information 803, including an image (e.g., a direction indicator) or a video, in a lane on which the vehicle 201 drives. The processor 120 may add and display an image as the first 3D navigation information 810 between the first lane 801 and the second lane 805 through lane recognition.

Figure 8B:
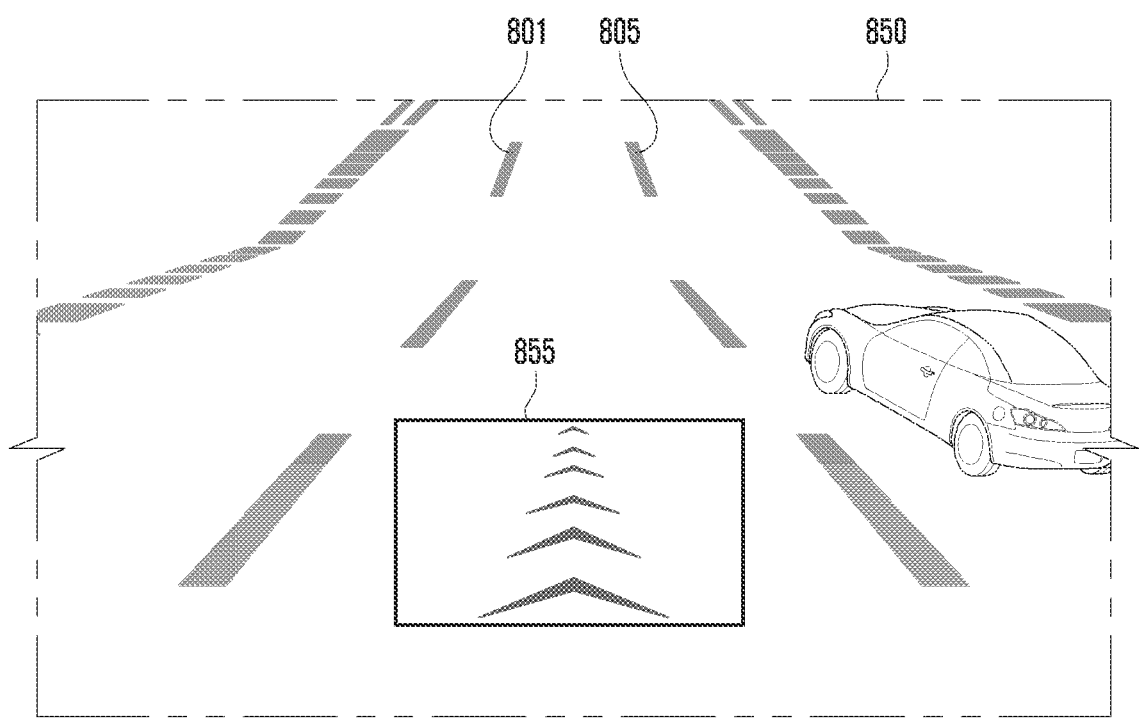
FIG. 8B illustrates an example of first two-dimensional (2D) navigation information according to an embodiment of the disclosure.

FIG. 8B illustrates an example of first 2D navigation information according to an embodiment of the disclosure.

Referring to FIG. 8B, in the case of the third condition (e.g., when HD map information is not acquired), the processor 120 may display first 2D navigation information. The processor 120 may display, based on position information of the vehicle 201, gaze information of a driver in the vehicle 201, and lane information (e.g., a first lane 801 and a second lane 805), the first 2D navigation information at a portion 855 of the windshield 850 of the vehicle 201. The portion 855 at which the first 2D navigation information is displayed may be a portion of a windshield-type head-up display, to which a transparent film is attached. The first 2D navigation information may be information in which virtual two-dimensional graphic information for driving guidance is planarly matched to and displayed on an actual object in the real world, and thus the graphic information may be provided two-dimensionally in the horizontal and/or vertical direction.

Figure 9A:
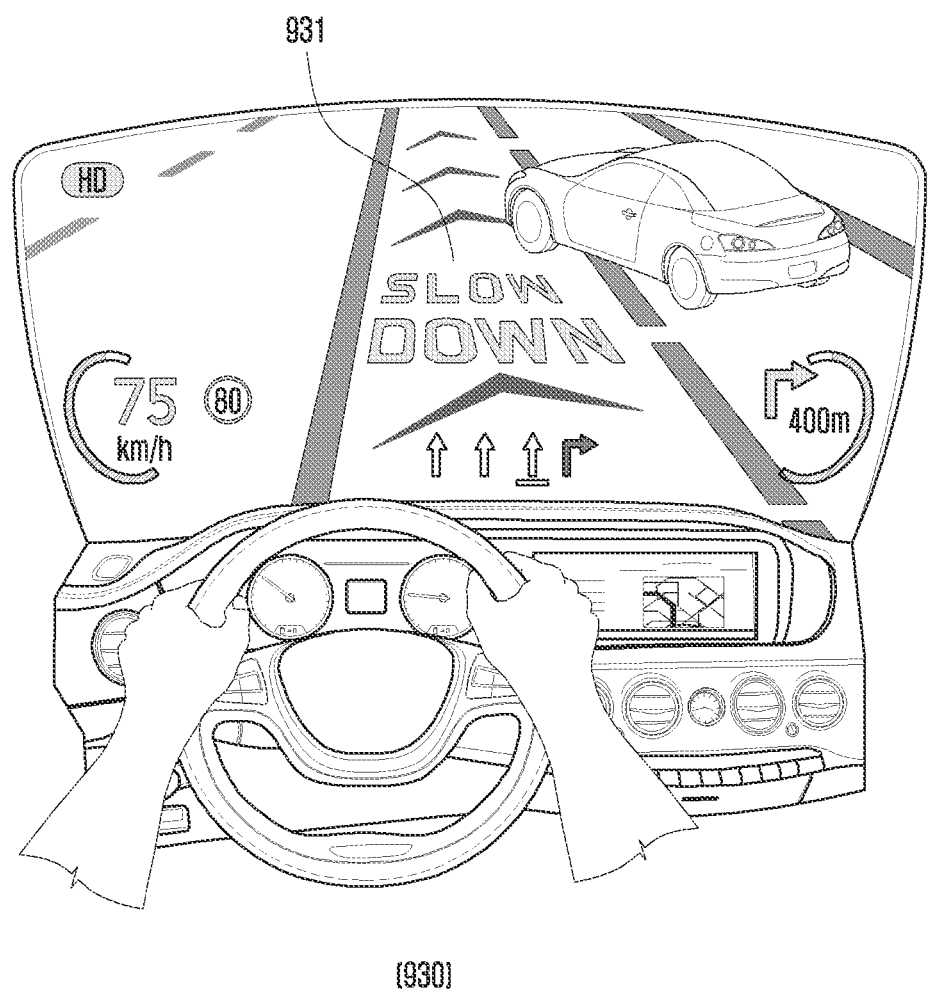
FIG. 9A illustrates second 3D navigation information according to an embodiment of the disclosure.

FIG. 9A illustrates second 3D navigation information according to an embodiment of the disclosure.

Referring to FIG. 9A, in second 3D navigation information 930, graphic information 931 for driving guidance may be configured as a text or an image, based on a lane of the vehicle 201 and a driver's gaze, and may be displayed in a lane on which the vehicle 201 drives. The graphic information 931 may include a text (e.g., slow down) and an image (e.g., a direction indicator). The processor 120 may identify an object (e.g., a road merging section) which is included in HD map information corresponding to position information. The processor 120 may identify that the road merging section is approaching, by using information on a distance between the vehicle 201 and an actual object (e.g., a lane) acquired through a sensor disposed in the vehicle 201 or V2X communication. The processor 120 may overlay and then display, based on the lane of the vehicle 201 and the driver's gaze, graphic information 931 which corresponds to 3D navigation information corresponding to the road merging section.

Figure 9B:
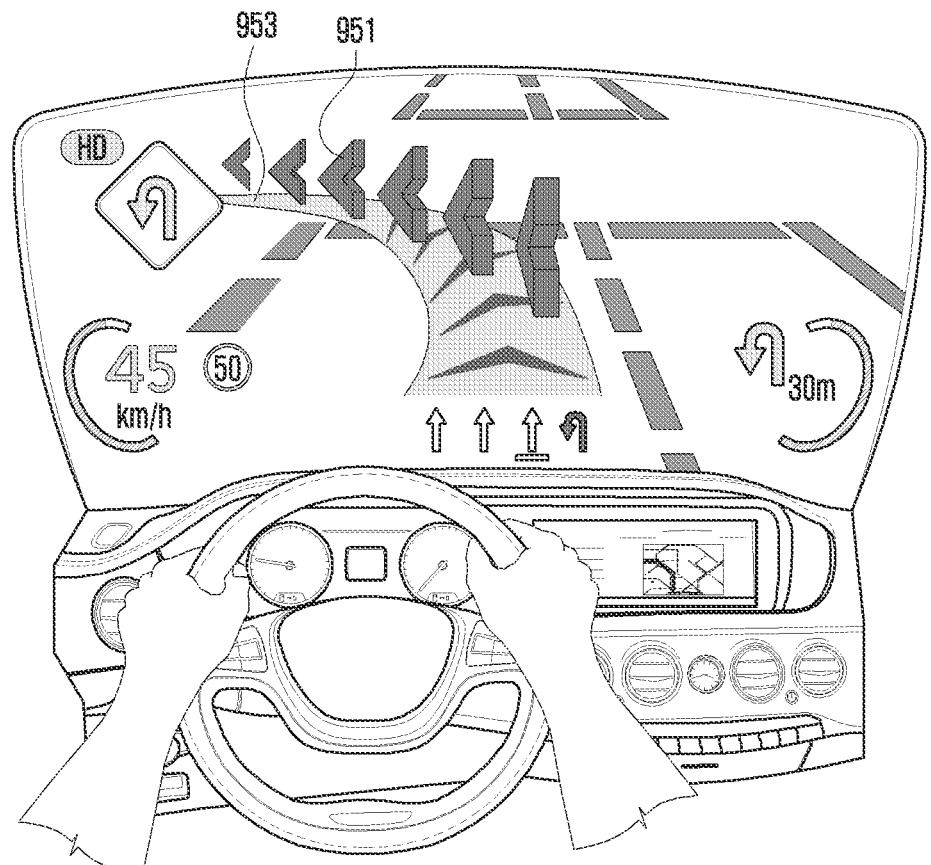
FIG. 9B illustrates third 3D AR navigation information according to an embodiment of the disclosure.

FIG. 9B illustrates third 3D AR navigation information according to an embodiment of the disclosure.

Referring to FIG. 9B, in the case of the first condition, the processor 120 may display third 3D navigation information 950. The third 3D navigation information 950 may include: a first image 953 displayed in a surface form on a lane on which the vehicle 201 drives; and a second image 951 (e.g., arrows) appearing to float above the lane. The processor 120 may identify, using HD map information, that a turn point corresponding to position information of the vehicle 201 is at a short distance. The processor 120 may identify, using object information included in the HD map information, sign information (e.g., a left turn, a forked road) or traffic light information which is related to signs or traffic lights on a route from the current position of the vehicle 201 to a destination. Alternatively, the processor 120 may identify, using information on a distance between the vehicle 201 and an actual object (e.g., a traffic light) acquired by a sensor disposed in the vehicle 201 or through V2X communication, that the vehicle 201 approaches the turn point (e.g., a left turn) on a route from the current position of the vehicle 201 to a destination.

The processor 120 may overlay and display, based on the lane of the vehicle 201 and the driver's gaze, the third 3D navigation information 950 corresponding to the turn point. The third 3D navigation information 950 may include, as virtual graphic information, sign information (e.g., a text (e.g., the distance until a left turn), and a left-turn image), traffic light information, speed information, or information such as the distance until a destination. The processor 120 may overlay and display the third 3D navigation information 950 on a lane on which the vehicle 201 drives.

Figure 10A:
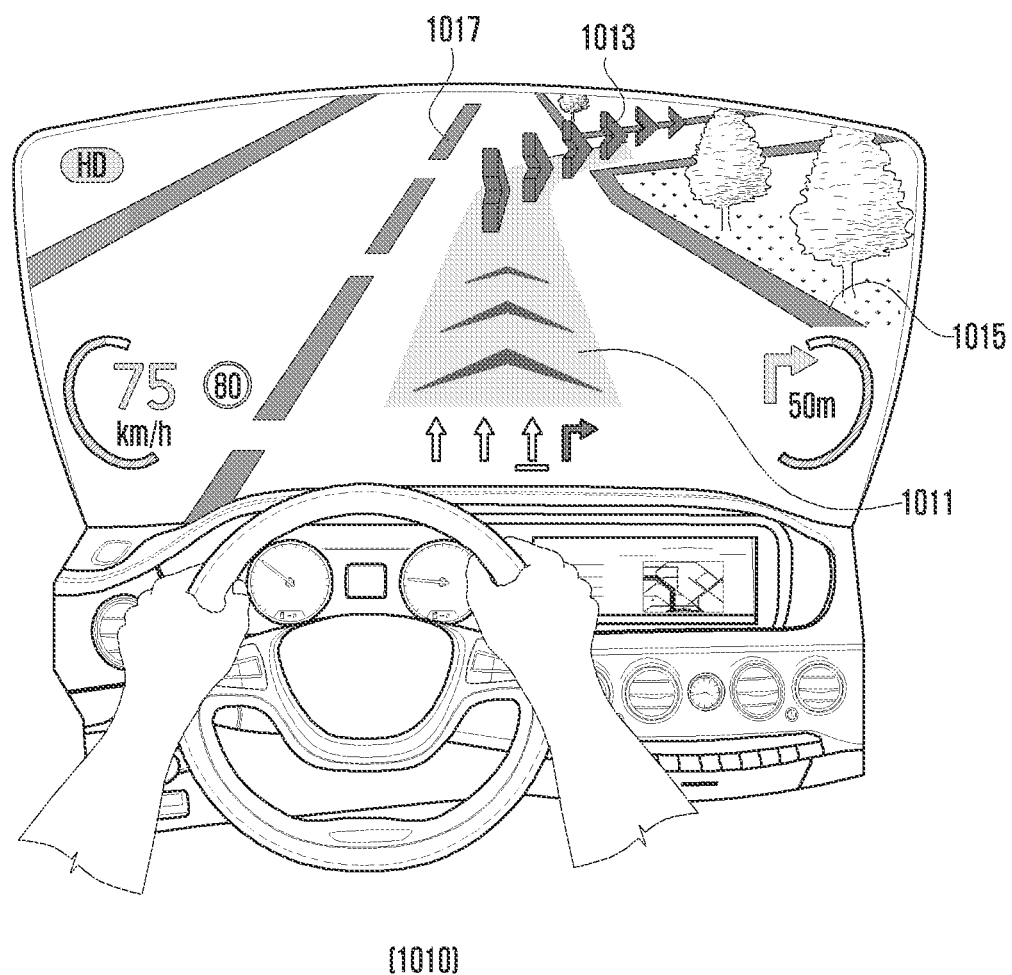
FIG. 10A illustrates fourth 3D navigation information according to embodiment of the disclosure.

FIG. 10A illustrates fourth 3D navigation information according to an embodiment of the disclosure.

Referring to FIG. 10A, in the case of the first condition, the processor 120 may display fourth 3D navigation information 1010. The processor 120 may identify object information from HD map information corresponding to position information of the vehicle 201. For example, the processor 120 may identify lane information 1017, sign information (e.g., a right turn) or traffic light information from the object information included in the HD map information on a route from the current position of the vehicle 201 to a destination. Alternatively, the processor 120 may identify that a turn point (e.g., a right turn) is approaching, by using information on a distance between the vehicle 201 and an actual object (e.g., the lane information 1017, sign information, traffic light information, or a boundary line 1015 (e.g., a tree)) acquired by a sensor disposed in the vehicle 201 or through V2X communication.

The processor 120 may generate, based on the lane of the vehicle 201 and the driver's gaze, the fourth 3D navigation information 1010 corresponding to the turn point. The processor 120 may spatially match and display the 3D navigation information 1010 to and on an actual object in the real world, based on the object information and the distance information. The processor 120 may display the fourth 3D navigation information 1010 including: a first image 1011 displayed in a surface form on a lane on which the vehicle 201 drives; and a second image 1013 (e.g., arrows) appearing to float above the lane. The fourth 3D navigation information 1010 may include, as virtual graphic information, traffic light information (e.g., a text (e.g., the distance until a right turn), and a right-turn image), speed information, or information such as the distance until a destination. The processor 120 may overlay and then display the fourth 3D navigation information 1010 on the lane on which the vehicle 201 drives.

Figure 10B:
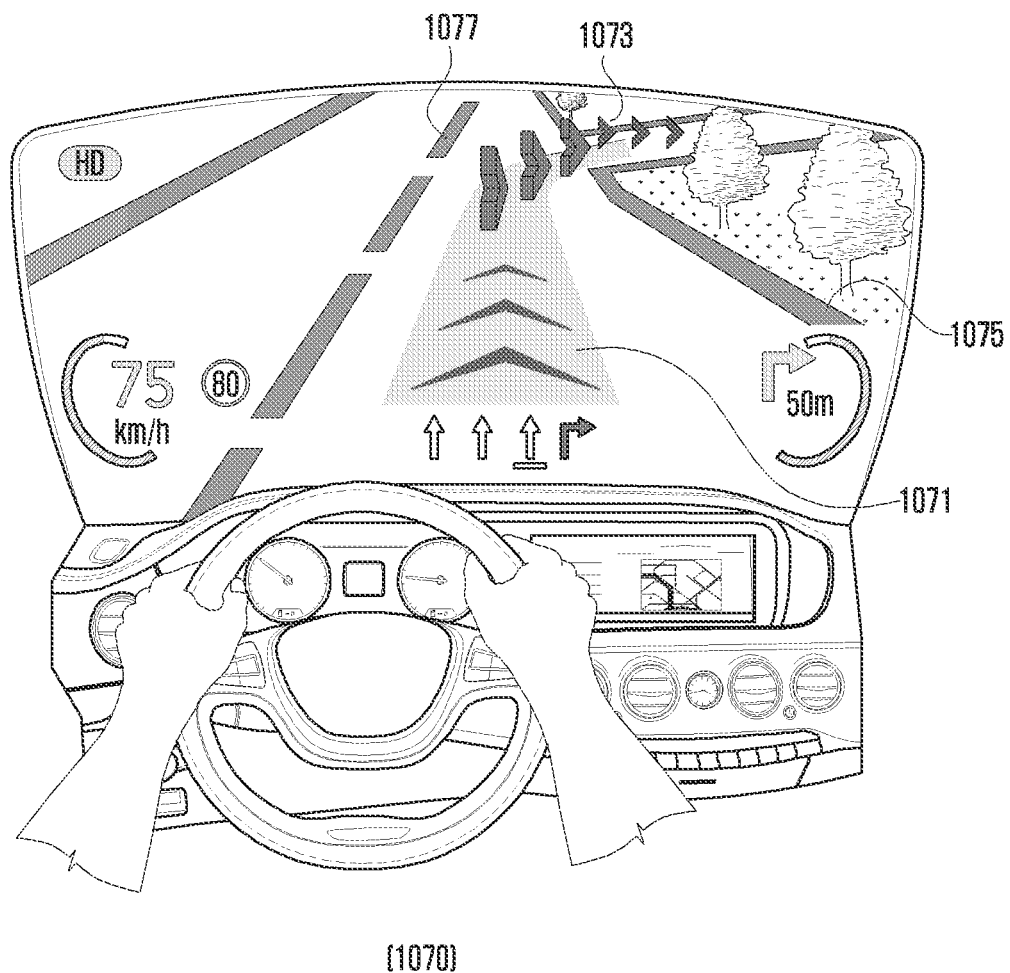
FIG. 10B illustrates 3D and 2D navigation information according to an embodiment of the disclosure.

FIG. 10B illustrates 3D and 2D navigation information according to an embodiment of the disclosure.

Referring to FIG. 10B, in the case of the second condition (e.g., when HD map information is acquired but a lane is not recognized), the processor 120 may display 3D and 2D navigation information 1070. The processor 120 may identify object information from HD map information corresponding to position information of the vehicle 201. The processor 120 may identify lane information 1077, sign information (e.g., a right turn) or traffic light information from the object information included in the HD map information on a route from the current position of the vehicle 201 to a destination. Alternatively, the processor 120 may identify that a turn point (e.g., a left turn) is approaching, by using information on a distance between the vehicle 201 and an actual object (e.g., the lane information 1077, sign information, traffic light information, a boundary line 1075 (e.g., a tree)) acquired by a sensor disposed in the vehicle 201 or through V2X communication.

According to various embodiments, when HD map information is acquired but a lane is not recognized, the processor 120 may display the 3D and 2D navigation information 1070, based on a driver's gaze. In the 3D and 2D navigation information 1070, 3D navigation information 1071 may be displayed to correspond to a first distance, and 2D navigation information 1073 may be displayed to correspond to a second distance. The larger the distance from the current position of the vehicle 201 becomes, the smaller the significance of a Z value (e.g., distance information) becomes. Thus, when position accuracy is reduced (e.g., in the case of a failure in lane recognition), two-dimensional navigation information may be displayed to correspond to the distance far from the vehicle 201. The processor 120 may display the 2D navigation information 1073, which is navigation information displayed to correspond to the second distance, on a vertical plane at the second distance. The 3D navigation information corresponding to the first distance may be identical or similar to that of FIG. 10A.

Figure 11:
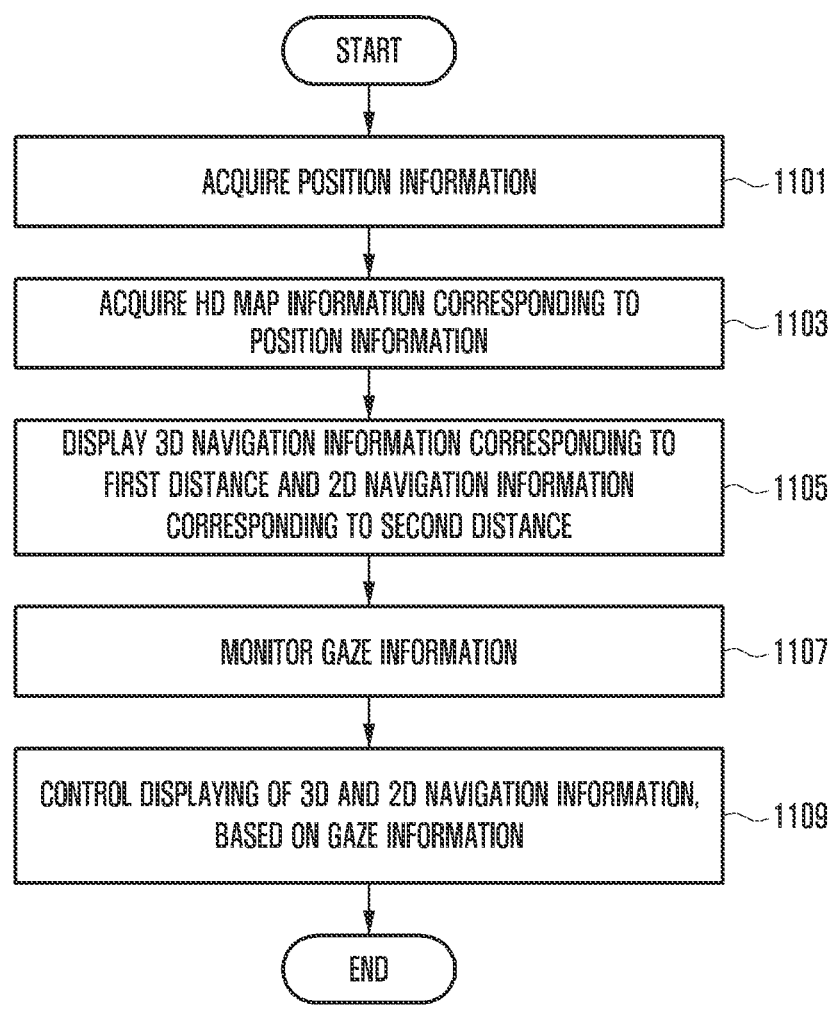
FIG. 11 is a flowchart illustrating a method for displaying 3D and 2D navigation information by an electronic device according to an embodiment of the disclosure.

FIG. 11 is a flowchart illustrating a method for displaying 3D and 2D navigation information by an electronic device according to an embodiment of the disclosure. FIG. 11 shows operations performed when HD map information is acquired but a lane is not identified (e.g., in the case of the second condition).

Referring to FIG. 11, in operation 1101, a processor (e.g., the processor 120 in FIG. 1) of an electronic device (e.g., the electronic device 101 in FIG. 1) according to various embodiments may acquire position information. The processor 120 may receive position information of the vehicle 201 from a GPS receiver, may receive distance information or speed information from LIDAR, or may receive one or more types of information on the position of a surrounding vehicle from another electronic device (e.g., another vehicle, road infrastructures, and a mobile device of another vehicle). The processor 120 may calculate position information of the vehicle 201, based on the received one or more types of information. As more types of information are received, the processor 120 may more accurately calculate the position information of the vehicle 201.

In operation 1103, the processor 120 may acquire HD map information corresponding to the position information. The HD map information may be acquired from a memory (e.g., the memory 130 in FIG. 1), or may be received, periodically or in real time, from a position providing server (e.g., the server 108 in FIG. 1).

In operation 1105, the processor 120 may display 3D navigation information corresponding to a first distance and 2D navigation information corresponding to a second distance. When HD map information is acquired but a lane is not recognized (e.g., in the case of the second condition or the intermediate accuracy), the processor 120 may generate 3D and 2D navigation information (e.g., the 3D and 2D navigation information 1070 in FIG. 10B) which includes 3D navigation information and 2D navigation information. The larger the distance from the current position of the vehicle 201 becomes, the smaller the significance of a Z value (e.g., distance information) becomes. Thus, when position accuracy is reduced (e.g., in the case of a failure in lane recognition), two-dimensional navigation information may be displayed to correspond to the distance far from the vehicle 201. The processor 120 may display 3D navigation information (e.g., the first 3D navigation information 631 in FIG. 6B) corresponding to a distance close to the vehicle 201 (e.g., the first distance). The 3D navigation information may be identical or similar to the 3D navigation information 610 in FIG. 6A. The processor 120 may generate 2D navigation information (e.g., the 2D navigation information 1073 in FIG. 10B) corresponding to a distance far from the vehicle 201 (e.g., the second distance).

For example, the first distance is a distance close to the vehicle 201, and thus, when HID map information is present, navigation information can be displayed in 3D even though a lane is not identified. The second distance, which is beyond the first distance, is a distance far from the vehicle, and thus, if navigation information is displayed in 3D, a display error may become larger. The processor 120 may generate navigation information, which is to be displayed beyond the first distance, in the form of 2D navigation information. The processor 120 may generate 2D navigation information such that navigation information is displayed on a vertical plane at the second distance (e.g., a point beyond the first distance).

In operation 1107, the processor 120 may monitor gaze information. The processor 120 may receive information from a sensor or a camera, mounted inside or outside the vehicle 201 to identify the gaze information. For example, the processor 120 may collect at least one of position information, speed information, turn information, or image information of the vehicle 201 from the first information collection module 310 or the second information collection module 350. The first information collection module 310 may include at least one of a GPS sensor (or a receiver), LIDAR, an acceleration sensor, a geomagnetic sensor, or a camera. The second information collection module 350 may include at least one of the wireless communication module 351, the map information acquisition module 353, or the vehicle information detection module 355. The processor 120 may identify the gaze information but may not identify the lane information.

In operation 1109, the processor 120 may control, based on the gaze information, displaying of the 3D and 2D navigation information. The processor 120 may display 3D navigation information along the distance of the vehicle 201 up to the first distance from the vehicle 201. The processor 120 may display graphic information for driving guidance, corresponding to the second distance, in the form of 2D navigation information in a two-dimensional plane without distance information.

Figure 12:
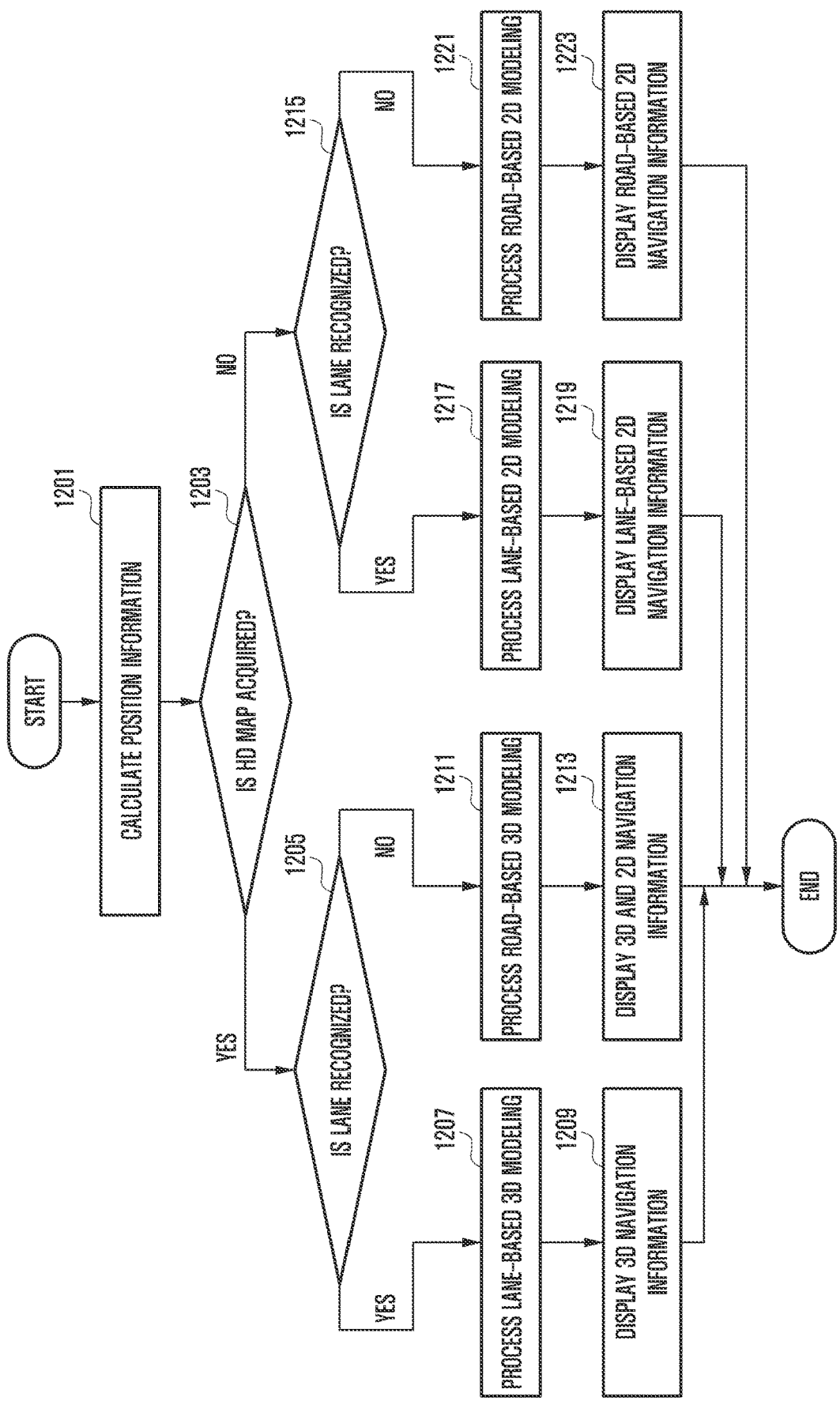
FIG. 12 is a flowchart illustrating a method for displaying navigation information by an electronic device according to an embodiment of the disclosure.

FIG. 12 is a flowchart illustrating a method for displaying navigation information by an electronic device according to an embodiment of the disclosure.

Referring to FIG. 12, in operation 1201, a processor (e.g., the processor 120 in FIG. 1) of an electronic device (e.g., the electronic device 101 in FIG. 1) according to various embodiments may calculate position information. The processor 120 may receive position information of the vehicle 201 from a GPS receiver, may receive, from LIDAR, information on a distance between the vehicle 201 and a surrounding object or speed information of the vehicle 201, or may receive one or more types of information of a surrounding vehicle or information on a distance between the vehicle 201 and the surrounding vehicle or an object from another electronic device (e.g., another vehicle, road infrastructure, and a mobile device of another vehicle). Operation 1201 is identical or similar to operation 1101, and thus a detailed description thereof will be omitted.

In operation 1203, the processor 120 may identify (or determine) whether HD map information has been acquired. HD map information may include various types of information based on a lane, unlike non-HD map information (e.g., typical map information), and thus may increase the accuracy of position information. However, HD map information may be absent according to a position, and thus it may be difficult to acquire HD map information in real time. The processor 120 may acquire the HD map information during the calculation of the position information in operation 1201. The processor 120 may perform operation 1205 when HD map information is acquired, and may perform operation 1215 when HD map information is not acquired.

When HD map information has been acquired, the processor 120 may identify (or determine), in operation 1205, whether a lane is recognized. If navigation information is displayed based on HD map information, an error may occur when navigation information is displayed based on a lane or the direction of a driver's gaze. In order to reduce a display error, the processor 120 may generate (or display) different types of navigation information depending on when a lane is recognized or when a lane is not recognized. The processor 120 may perform operation 1207 when a lane is recognized, and may perform operation 1211 when the lane is not recognized.

When HD map information is acquired and a lane is recognized (e.g., the first condition, high accuracy), in operation 1207, the processor 120 may process lane-based 3D modeling. The processor 120 may process the lane-based 3D modeling by using HD map information corresponding to position information. 3D modeling may be a modeling technique for displaying navigation information as a three-dimensional layer. The lane-based 3D modeling may be a technique of modeling on the basis of a lane, navigation information in a three-dimensional layer. The lane-based 3D modeling may be used when collected information has very high accuracy (e.g., the first condition). The processor 120 may generate 3D navigation information by using navigation information in which lane-based 3D modeling has been processed. In the 3D navigation information, virtual three-dimensional graphic information for driving guidance may be spatially matched to and displayed on an actual object in the real world by using the HD map information. The 3D navigation information may be provided three-dimensionally such that the graphic information includes distance information in horizontal and/or vertical directions, and may be information in which the graphic information is projected in different sizes according to distance.

In operation 1209, the processor 120 may display 3D navigation information. The processor 120 may display 3D navigation information (e.g., the 3D navigation information 610 in FIG. 6A or the 3D AR navigation information in FIGS. 8A to 8D) in all or a part of the region of the windshield of the vehicle 201. In the 3D navigation information, a display error may occur according to a lane or a gaze direction of a driver. The processor 120 may calculate, based on gaze information and lane information, an angle and a distance for displaying 3D navigation information, and may determine, based on the calculated angle and distance, a display position of the 3D navigation information. The processor 120 may display the 3D navigation information, matched to an actual object in the real world, at the determined display position.

When HD map information is acquired but a lane is not recognized (e.g., in the case of the second condition or the intermediate accuracy), the processor 120 may process road-based 3D modeling in operation 1211. The road-based 3D modeling may be a technique of modeling 3D navigation information on the basis of a road. When lane information is not identified, the processor 120 may model 3D navigation information by using road-based 3D modeling instead of lane-based 3D modeling. The processor 120 may generate 3D and 2D navigation information by using navigation information in which road-based 3D modeling has been processed. The 3D and 2D navigation information (e.g., the 3D and 2D navigation information 630 in FIG. 6B) may be generated when HD map information is acquired but a lane is not recognized (e.g., in the case of the second condition). The 3D and 2D navigation information 630 may be information in which 3D navigation information is displayed with respect to a first distance from the vehicle 201 (e.g., a short distance section) and 2D navigation information is displayed with respect to a second distance from the vehicle 201 (e.g., a remote distance section).

According to various embodiments, the processor 120 may calculate, based on gaze information and lane information, an angle and a distance for displaying navigation information with respect to the first distance (e.g., the third region 605), and may determine, based on the calculated angle and distance, a display position of 3D navigation information. In the 3D navigation information, virtual three-dimensional graphic information for driving guidance is spatially matched to and displayed on an actual object in the real world, and the graphic information may be differently displayed according to a distance from the vehicle 201. With respect to the second distance (e.g., the fourth region 607), the processor 120 may generate 2D navigation information such that navigation information to be displayed in the fourth region 607 is displayed on a plane of the fourth display position 507 (a plane perpendicular to the ground).

In operation 1213, the processor 120 may display 3D and 2D navigation information. The 3D and 2D navigation information may be information in which 3D navigation information is displayed to correspond to the first distance and 2D navigation information is displayed to correspond to the second distance beyond the first distance. The processor 120 may display 3D AR navigation information and 2D navigation information together, based on object information included in HD map information or distance information on a distance between the vehicle 201 and an actual object in the real world.

When HD map information is not acquired (e.g., when non-HD map information has been acquired), in operation 1215, the processor 120 may identify (determine) whether a lane is recognized. Operation 1215 is identical or similar to operation 1205, and thus a detailed description thereof will be omitted. The processor 120 may perform operation 1217 when a lane is recognized, and may perform operation 1221 when a lane is not recognized.

When HD map information is not acquired but a lane is recognized (e.g., in the case of the third condition or the low accuracy), in operation 1217, the processor 120 may process lane-based 2D modeling. The 2D modeling may be a modeling technique for displaying navigation information as a two-dimensional layer. The lane-based 2D modeling may be a technique of modeling navigation information on the basis of a lane. The processor 120 may generate lane-based 2D navigation information according to non-HD map information through the lane-based 2D modeling. The lane-based 2D navigation information (e.g., the 2D navigation information 670 in FIG. 6D) may be information in which virtual two-dimensional graphic information for driving guidance is planarly matched to and displayed on an actual object in the real world. In the lane-based 2D navigation information, the graphic information may be provided two-dimensionally in the horizontal and/or vertical directions and may be projected in the same size. The processor 120 may generate the lane-based 2D navigation information 670 corresponding to the third region 605, but may not generate navigation information corresponding to the fourth region 607.

In operation 1219, the processor 120 may display the lane-based 2D navigation information. For example, the processor 120 may display lane-based 2D navigation information only with respect to a predetermined distance (e.g., the third region 605, a short distance), and may not display navigation information with respect to a distance (e.g., the fourth region 607, a remote distance) beyond the predetermined distance.

When HD map information is not acquired and a lane is not recognized (e.g., in the case of the fourth condition or low accuracy), in operation 1221, the processor 120 may process road-based 2D modeling. The road-based 2D modeling is a technique of modeling navigation information on the basis of a road, and may have lower accuracy than the lane-based 2D modeling. The processor 120 may generate road-based 2D navigation information through the road-based 2D modeling. The road-based 2D navigation information may be identical to or different from the lane-based 2D navigation information generated in operation 1217. The processor 120 may generate road-based 2D navigation information corresponding to the third region 605 but may not generate navigation information corresponding to the fourth region.

In operation 1223, the processor 120 may display the road-based 2D navigation information. For example, the processor 120 may display road-based 2D navigation information only with respect to a predetermined distance (e.g., third region 605), and may not display navigation information corresponding to a distance (e.g., the fourth region 607) beyond the predetermined distance.

An operation method of an electronic device according to various embodiments may include: acquiring position information of a vehicle from a communication module of the electronic device; determining whether high definition (HD) map information corresponding to the position information is acquired; and displaying three-dimensional navigation information in augmented reality by using the HD map information when the HD map information is acquired, and displaying two-dimensional navigation information when the HD map information is not acquired, wherein the three-dimensional navigation information is information in which virtual three-dimensional graphic information for driving guidance is spatially matched to and displayed on an actual object in the real world by using the HD map information, and the two-dimensional navigation information is information in which virtual two-dimensional graphic information for driving guidance is planarly matched to and displayed on an actual object in the real world.

The method may further include identifying gaze information of a driver in the vehicle by using an image of the driver captured by a first camera of the electronic device, wherein the displaying includes controlling, based on the gaze information, displaying of the three-dimensional navigation information or the two-dimensional navigation information.

The method may further include identifying lane information of the vehicle by using an image in front of the vehicle, captured by a second camera of the electronic device, wherein the displaying includes controlling, based on the gaze information and the lane information, displaying of the three-dimensional navigation information or the two-dimensional navigation information.

The method may further include acquiring information on a distance between the vehicle and an actual object near the vehicle, measured via a sensor disposed in the vehicle, from the communication module, wherein the displaying includes matching and displaying the three-dimensional navigation information to and on an actual object in the real world by using the HD map information and the distance information.

The method may further include: when the HD map information is acquired, determining, based on the lane information, whether a lane is recognized; when the lane is recognized, displaying three-dimensional navigation information by using the HD map information; and when the lane is not recognized, displaying 3D and 2D navigation information which includes three-dimensional navigation information and two-dimensional navigation information.

The displaying may include: calculating, based on the lane information or the gaze information, an angle and a distance for displaying the three-dimensional navigation information; determining, based on the calculated angle and distance, a display position of the three-dimensional navigation information; and displaying the three-dimensional navigation information on an actual object in the real world, based on the display position.

The 3D and 2D navigation information may be configured such that 3D navigation information is displayed to correspond to a first distance, and 2D navigation information is displayed to correspond to a second distance beyond the first distance.

The method may further include: generating navigation information, which is to be displayed at the second distance, as the 2D navigation information; and displaying the 2D navigation information on a plane at a point beyond the first distance.

The method may further include changing a display position at which the 2D navigation information is to be displayed, when a turn point is included within the first distance according to a position change of the vehicle.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a transparent display;
a communication module;

a memory;

a second camera configured to capture an image in front of a vehicle; and a processor, wherein the processor is configured to:
- acquire position information of the vehicle via the communication module,
- identify lane information of the vehicle by using the image in front of the vehicle, captured by the second camera,
- determine whether high definition (HD) map information corresponding to the position information is acquired,
- determine whether a lane is recognized, based on the lane information,
- when the HD map information is not acquired, display two-dimensional (2D) navigation information in augmented reality,
- when the HD map information is acquired and the lane is recognized, display three-dimensional (3D) navigation information in augmented reality by using the HD map information, and
- when the HD map information is acquired and the lane is not recognized, display, using the HD map information, 3D and 2D navigation information in which the 3D navigation information is displayed to correspond to a first distance, and the 2D navigation information is displayed to correspond to a second distance beyond the first distance, wherein the displaying of the 3D navigation information comprises virtual 3D graphic information for driving guidance being spatially matched to, and displayed, via the transparent display, in alignment with an actual object in a real world by using the HD map information, and wherein the displaying of the 2D navigation information comprises virtual 2D graphic information for driving guidance is planarly matched to, and displayed in alignment with the actual object in the real world.

2. The electronic device of claim 1, further comprising:
a first camera configured to capture an image of a driver in the vehicle,
wherein the processor is further configured to:
- identify gaze information of the driver by using the image of the driver captured by the first camera, and
- control, based on the gaze information, the displaying of the 3D navigation information or the displaying of the 2D navigation information.

3. The electronic device of claim 2,
wherein the processor is configured to:
- control, based on the gaze information and the lane information, displaying of the 3D navigation information or the 2D navigation information.

4. The electronic device of claim 3, wherein the processor is configured to:
- calculate, based on the lane information or the gaze information, an angle and a distance for displaying the 3D navigation information,
- determine, based on the calculated angle and distance, a display position of the 3D navigation information, and
- display, based on the display position, the 3D navigation information on the actual object of the real world.

5. The electronic device of claim 1, wherein the processor is configured to:
- acquire, from the communication module, information on a distance between the vehicle and the actual object near the vehicle, measured by a sensor disposed in the vehicle; and
- match and display the 3D navigation information to and on the actual object in the real world by using the HD map information and the distance information.

6. The electronic device of claim 1, wherein the processor is further configured to:
- generate navigation information, which is to be displayed at the second distance, as the 2D navigation information; and
- display the 2D navigation information on a plane at a point beyond the first distance.

7. The electronic device of claim 1, wherein the processor is further configured to determine a display position at which the 2D navigation information is to be displayed, based on at least one of a type of road on which the vehicle drives, a crossroads, a driving environment, or a speed.

8. The electronic device of claim 7, wherein the processor is further configured to change the display position at which the 2D navigation information is to be displayed, when a turn point is included within the first distance according to a position change of the vehicle.

9. The electronic device of claim 1, wherein the processor is further configured to display the 2D navigation information corresponding to the first distance and not to display navigation information corresponding to the second distance beyond the first distance.

10. An operation method of an electronic device, the method comprising:
- acquiring position information of a vehicle from a communication module of the electronic device;
- identifying lane information of the vehicle by using an image in front of the vehicle, captured by a second camera;
- determining whether high definition (HD) map information corresponding to the position information is acquired;
- determining whether a lane is recognized, based on the lane information;
- when the HD map information is not acquired, displaying two-dimensional (2D) navigation information;
- when the HD map information is acquired and the lane is recognized, displaying, via a transparent display, three-dimensional (3D) navigation information in augmented reality by using the HD map information; and
- when the HD map information is acquired and the lane is not recognized, displaying, using the HD map information, 3D and 2D navigation information in which the 3D navigation information is displayed to correspond to a first distance, and the 2D navigation information is displayed to correspond to a second distance beyond the first distance, wherein the displaying of the 3D navigation information comprises virtual 3D graphic information for driving guidance is spatially matched to, and displayed, via the transparent display, in alignment with an actual object in a real world by using the HD map information, and wherein the displaying of the 2D navigation information comprises virtual 2D graphic information for driving guidance is planarly matched to, and displayed, via the transparent display, in alignment with the actual object in the real world.

11. The method of claim 10, further comprising identifying gaze information of a driver in the vehicle by using an image of the driver captured by a first camera,
wherein the displaying of the 3D navigation information or the 2D navigation information is controlled based on the gaze information.

12. The method of claim 11,
wherein the displaying comprises controlling, based on the gaze information and the lane information, displaying of the 3D navigation information or the 2D navigation information.

13. The method of claim 12, wherein the displaying comprises:
calculating, based on the lane information or the gaze information, an angle and a distance for displaying the 3D navigation information;
determining, based on the calculated angle and distance, a display position of the 3D navigation information; and
displaying the 3D navigation information on the actual object in the real world, based on the display position.

14. The method of claim 10, further comprising acquiring information on a distance between the vehicle and the actual object near the vehicle, measured by a sensor disposed in the vehicle, from the communication module,
wherein the displaying comprises matching and displaying the 3D navigation information to and on the actual object in the real world by using the HD map information and the distance information.

15. The method of claim 10, further comprising:
generating navigation information, which is to be displayed at the second distance, as the 2D navigation information; and
displaying the 2D navigation information on a plane at a point beyond the first distance.

16. The method of claim 15, further comprising changing a display position at which the 2D navigation information is to be displayed, when a turn point is included within the first distance according to a position change of the vehicle.

* * * * *